US012720141B2

(12) United States Patent
Kim et al.

(10) Patent No.: US 12,720,141 B2
(45) Date of Patent: Aug. 25, 2026

(54) DISPLAY DEVICE AND METHOD FOR DISPLAYING THEREOF FOR DISPLAYING ADDITIONAL DATA AREAS OF AN EXTERNAL DISPLAY SCREEN

(71) Applicant: Samsung Electronics Co., Ltd., Suwon-si (KR)

(72) Inventors: Hyunseok Kim, Suwon-si (KR); Heejun Koo, Suwon-si (KR); Sungju Kim, Suwon-si (KR); Sangwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/081,443

(22) Filed: Mar. 17, 2025

(65) Prior Publication Data

US 2025/0392775 A1 Dec. 25, 2025

Related U.S. Application Data

(63) Continuation of application No. PCT/KR2025/002846, filed on Feb. 28, 2025.

(30) Foreign Application Priority Data

Jun. 21, 2024 (KR) ........................ 10-2024-0081347

(51) Int. Cl.

| | |
|---|---|
| ***H04N 21/41*** | (2011.01) |
| ***H04N 21/422*** | (2011.01) |
| ***H04N 21/43*** | (2011.01) |
| ***H04N 21/431*** | (2011.01) |
| ***H04N 21/478*** | (2011.01) |
| ***H04N 21/485*** | (2011.01) |

(52) U.S. Cl.
CPC ..... *H04N 21/4122* (2013.01); *H04N 21/4222* (2013.01); *H04N 21/43079* (2020.08); *H04N 21/4316* (2013.01); *H04N 21/4781* (2013.01); *H04N 21/4858* (2013.01)

(58) Field of Classification Search
CPC ......... H04N 21/4122; H04N 21/43079; H04N 21/4222; H04N 21/4316; H04N 21/4781; H04N 21/4858
USPC .......................................................... 345/1.1
See application file for complete search history.

(56) References Cited

U.S. PATENT DOCUMENTS 9,052,818 B2 6/2015 Lee et al.
9,578,072 B2 2/2017 Walker
(Continued)

FOREIGN PATENT DOCUMENTS

CN 114143586 A 3/2022
KR 10-1320919 10/2013
(Continued)

OTHER PUBLICATIONS

International Search Report with Written Opinion dated Jun. 11, 2025 issued in PCT Application No. PCT/KR2025/002846.

*Primary Examiner* — Mark Edwards
(74) *Attorney, Agent, or Firm* — STAAS & HALSEY LLP

(57) ABSTRACT

A display device incudes memory, a display, a communication interface, and a processor. The processor obtains and stores pixel data of a content screen displayed by an external display device, extracts an additional information area included in the content screen based on the stored pixel data, and displays the extracted additional information area.

18 Claims, 20 Drawing Sheets

(56) References Cited

U.S. PATENT DOCUMENTS

| | | | | |
|---|---|---|---|---|
| 10,739,907 | B2 | 8/2020 | Han et al. | |
| 2020/0139246 | A1* | 5/2020 | Kinney | A63F 13/35 |
| 2024/0118857 | A1 | 4/2024 | Kang | |

FOREIGN PATENT DOCUMENTS

| | | | | |
|---|---|---|---|---|
| KR | 10-2014-0121399 | | 10/2014 | |
| KR | 10-2015-0009014 | | 1/2015 | |
| KR | 10-1480300 | | 1/2015 | |
| KR | 10-2017-0135542 | | 12/2017 | |
| KR | 10-2022-0128970 | | 9/2022 | |
| KR | 10-2022-0142198 | | 10/2022 | |
| KR | 20220142198 | A * | 10/2022 | G06F 3/0482 |
| KR | 10-2024-0021070 | | 2/2024 | |
| KR | 10-2024-0083510 | | 6/2024 | |

* cited by examiner

DISPLAY DEVICE AND METHOD FOR DISPLAYING THEREOF FOR DISPLAYING ADDITIONAL DATA AREAS OF AN EXTERNAL DISPLAY SCREEN

CROSS-REFERENCE TO RELATED APPLICATIONS

This application is a continuation of International Application No. PCT/KR2025/002846 designating the United States, filed on Feb. 28, 2025, in the Korean Intellectual Property Receiving Office and claiming priority to Korean Patent Application No. 10-2024-0081347, filed on Jun. 21, 2024, in the Korean Intellectual Property Office, the disclosures of each of which are incorporated by reference herein in their entireties.

BACKGROUND

Field

The disclosure relates to a display device that displays at least partial area of a screen displayed by an external display device and a method for displaying thereof.

Description of Related Art

Thanks to the development of electronic technologies, various types of display devices are used in a daily life. Among these display devices, there may be a sub display device, or the like implemented in a form of being connected to the external display device.

Conventionally, a user has connected and used the sub display device to a main display device to view a large screen in general. However, there are not many methods for utilizing the sub display device besides extending a screen size or duplicating and displaying the same screen.

Therefore, there is a need for a solution to increase utility of the display device that is used by connecting to the external display device.

SUMMARY

According to at least one embodiment of the disclosure, a display device may include a display, and a processor configured to display, on the display, an extracted additional information area, wherein the additional information area is included in a content screen displayed by an external display device and was extracted from the content screen based on pixel data of the content screen, and control the display to update at least part of the additional information area displayed on the display according to a change of the content screen displayed by the external display device per a preset update time point.

Also, according to at least one embodiment of the disclosure, a method of a display device that includes a display is provided, the method may include displaying, on the display, an extracted additional information area, wherein the additional information area is included in a content screen displayed by an external display device and was extracted based on pixel data of the content screen, and updating at least part of the additional information area displayed on the display according to a change of the content screen displayed by the external display device per a preset update time point.

Also, according to at least one embodiment of the disclosure, a non-transitory readable recording medium stores a program that, when executed by a display device, causes the display device to perform operations that may include displaying, on a display of the display device, an extracted additional information area, wherein the additional information area is included in a content screen displayed on an external display device and was extracted based on pixel data of the content screen, and updating at least part of the additional information area according to a change of the content screen displayed by the external display device per a preset update time point.

Moreover, according to at least one embodiment of the disclosure, a display device may include a display, a communication interface, and a processor configured to obtain, through the communication interface, pixel data of a content screen displayed by an external display device, extract an additional information area included in the content screen based on the obtained pixel data, display, on the display, the extracted additional information area, and control the display to update at least part of the additional information area displayed on the display according to a change of the content screen displayed by the external display device per a preset update time point.

DETAILED DESCRIPTION

Figure 1:
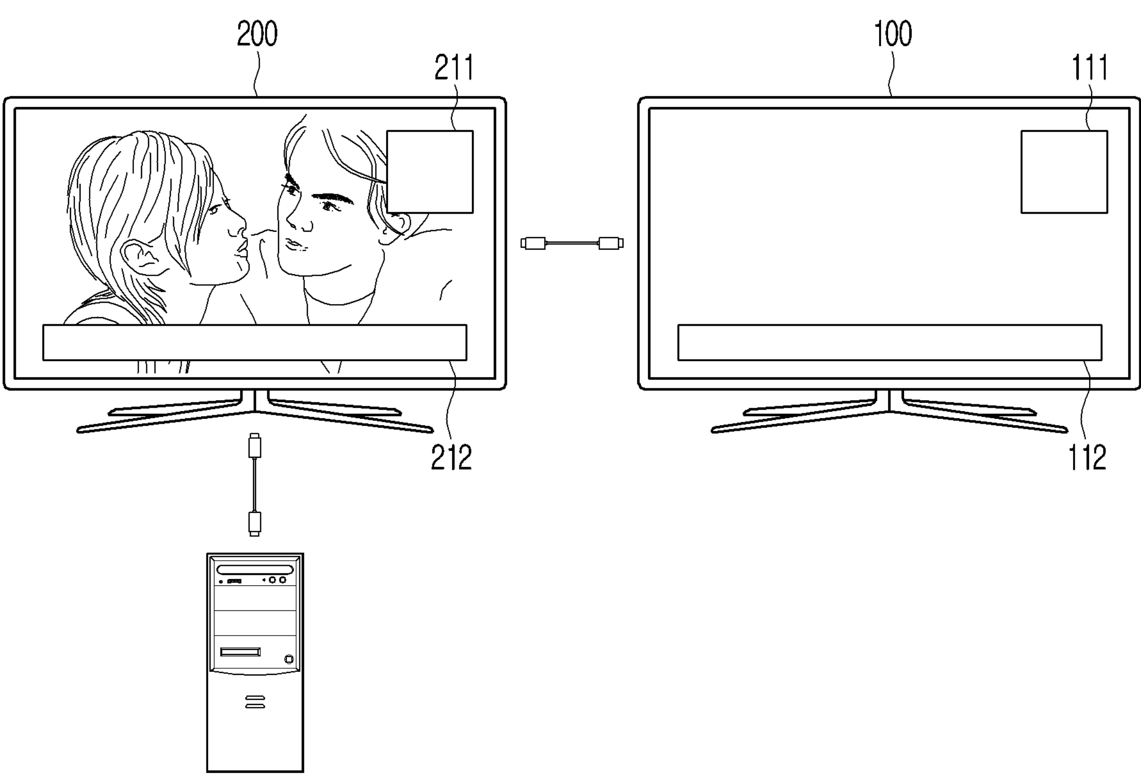
FIG. 1 is a view illustrating an operation of a display device according to at least one embodiment.

The terms used in various embodiments of the disclosure are selected as general terms which are currently widely used as much as possible in consideration of functions in the disclosure but may be varied depending on intention of those skilled in the art, a precedent, appearance of new technologies, or the like. Also, there is a term which is arbitrarily selected by the applicant in a certain case and in this case, its meaning is specifically described in the relevant description part of the disclosure. Therefore, the term used in the disclosure should be defined based on the meaning of the term and the entire content throughout the disclosure rather than simply the name of the term.

Various embodiments of the disclosure and the terms used therein are not intended to limit technical features described in the disclosure to a specific embodiment, wherein such embodiments should be interpreted to include various modifications, equivalents, or substitutes of the relevant embodiment.

With respect to the description of the drawings, a similar or related component may be designated by a similar reference numeral.

A singular form of a noun corresponding to an item may include one item or a plurality of items unless explicitly differently indicated in the related context.

In the disclosure, each of the phrases such as “A or B”, “at least one of A and B”, “at least one of A or B”, “at least one of A, and B”, “at least one of A, or B”, “A, B, or C”, “at least one of A, B, and C”, and “at least one of A, B, or C”, “at least one of A, B or C”, “at least one of “A, B and C” may be construed as including any one of items enumerated together with the relevant phrase among the phrases or all possible combinations thereof.

The term such as “1st”, “2nd”, “first”, or “second” may be used to simply distinguish one component from another component and is not intended to limit the relevant component in regard of a different aspect (e.g. importance or an order).

The description that one (e.g. a first) component is “coupled with/to” or “connected to” another (e.g. a second) component “operatively” or “communicatively” or without the relevant term should be interpreted such that the one component may be connected to the another component directly (e.g. wiredly), wirelessly, or through a third component.

The term “include” or “have” should be construed as designating that there is a characteristic, a number, a step, an operation, a component, a part, or a combination thereof described in the disclosure but not as excluding in advance the existence or possibility of adding one or more other characteristics, numbers, steps, operations, components, parts, or a combination thereof.

When it is described that one component “is connected to”, “is coupled to”, “is supported by”, or “contacts” another component, the description includes not only a case that the component is connected to, is coupled to, is supported by, or contacts the another component directly but also a case that the component is connected to, is coupled to, is supported by, or contacts the another component indirectly through a third component.

When it is described that one component is positioned “on” another component, the description includes not only a case that the component contacts the another component but also a case that the other component is present between two components.

The term “and/or” is construed as including a combination of a plurality of related and described components or any component of the plurality of related and described components.

In the disclosure, “module” or “part” may perform at least one function or operation and may be implemented as hardware or software, or as a combination of hardware and software. Also, a plurality of “modules” or “parts” may be integrated into at least one module and implemented as at least one processor, excluding a “module” or a “part” that needs to be implemented as specific hardware.

Meanwhile, various elements and areas in the drawings are illustrated schematically. Accordingly, the technical idea of the disclosure is not limited by the relative sizes or intervals illustrated in the appended drawings.

In the disclosure, the term “user” may refer to a person who uses an electronic device or a device used by the person.

Hereinafter, an embodiment of the disclosure is more specifically described with reference to the appended drawings.

FIG. 1 is a flow chart illustrating an operation of a display device 100 according to at least one embodiment.

In FIG. 1, the display device 100 is illustrated in a form of a monitor but the display device 100 may be implemented as various types of display devices such as a TV, a laptop, a monitor, a kiosk, a tablet PC, an electronic picture frame, a mobile phone, a large format display (LFD), Digital Signage, a Digital Information Display (DID), a video wall, and a projector display. Meanwhile, it is not limited thereto and may be implemented as various devices such as an image processing device (e.g. a set-top box, one connected box) that is connected to a display device to provide an image. Also, the aforementioned display devices are merely examples and any device capable of being connected to another display device or a server to perform the aftermentioned operation may be included in the display device according to various embodiments of the disclosure besides the aforementioned display devices.

In FIG. 1, an external display device 200 may be an independent device prepared separately from the display device 100. In FIG. 1, the external display device 200 is illustrated as the same type of device as a type of display device 100 but is not necessarily limited thereto, wherein it may be implemented as a different type of device or may be implemented as one wide monitor or may be implemented in a form of connecting three or more display devices. For example, if a content screen and an additional information area are displayed on one wide monitor, a content may be displayed in a defined section within one screen, the additional information area may be extracted based on pixel data of the content screen, and the extracted additional information area may be displayed in another section.

For convenience of the description, it is illustrated in the disclosure that the display device 100 and the external display device 200 are shown one by one but three or more devices are used to be connected to one another. Also, for convenience of the description, the display device 100 and the external display device 200 are shown in the disclosure but they may be alternatively referred to as a sub display device 100 and a main display device 200.

Meanwhile, various embodiments of the disclosure to be described hereinafter may not be necessarily performed only in a state of connecting a plurality of display devices 100, 200 to each other as shown in FIG. 1 but may apply to a case of dividing and using one large screen into a plurality of areas in a display device having the one large display. For example, an additional information area may be displayed by dividing a screen into the left and the right within a wide screen, displaying a content on the left, and storing and analyzing pixel data related to the content on the right.

According to FIG. 1, a display device 100 may be directly connected to an external display device 200. Accordingly, the display device 100 may obtain pixel data of a content screen displayed by the external display device 200.

The content screen may be a screen providing various types of contents such as a game content, a moving image content, a content displaying a document or a picture, an image, or the like, and a TV broadcast content. According to a type of content, the content screen may be classified as various types of screens such as a game content screen, a playback screen of a moving image content, a still screen, a playback screen of a music content, and a text content screen.

Meanwhile, on the content screen, various additional information related to the content may be displayed together. In the disclosure, an area where this additional information is displayed is referred to as an additional information area. That is, the additional information area may be a partial area included in the content screen displayed by the external display device 200. For example, if the displayed screen is a playback screen of a moving image or a music content, the external display device 200 may display a degree in which the moving image or the music content is played in a form of a bookmark or a progress bar. Otherwise, the external display device 200 may display a recommendation content area indicating a recommendation content related to the moving image or the music content, a text area indicating a text related to the moving image or the music content, etc. These additional information areas may be fixedly displayed on the content screen or may be selectively displayed according to selection of the user.

For example, in the case of a type of game content in which the user moves the user's own avatar within a game environment to perform various missions, additional information such as a map, a quest, or an item may be displayed on a game screen according to selection of the user or as the default. Part where this additional information is displayed is referred to as an additional information area. In the disclosure, an avatar may be an image that moves in accordance with a manipulation of the user. Alternatively, the avatar may be variously referred to as a character, a player, etc. The avatar may be created in a form of a human but is not limited thereto, wherein it may be created in various forms such as an animal, other objects, and a robot.

FIG. 1 shows a state that a progress bar 212, other additional information 211, and the like are displayed within the screen while the moving content is played by the external display device 200.

The additional information may include various information according to a type of content screen, so that it may be alternatively referred to as recommendation information, related information, display information, screen information, content information, or the like but in the disclosure, it is referred to as additional information.

The display device 100 analyzes pixel data configuring a content screen, extracts the additional information area 211, 212, and displays the extracted additional information area 111, 112 within the content screen. The displayed additional information area 111, 112 may be displayed in the same position, size, or form as that of the additional information area 211, 212 within a real content screen but is not necessarily limited thereto. For example, the display device 100 may display the additional information area 111, 112 in various display forms based on display option information for displaying the additional information area. The display option information may be changed by a setting of the user but is not limited thereto, wherein it may be information set as the default.

The additional information area may be displayed in various positions or devices depending on various conditions such as the number of display devices, a connection relation with the external device, and a characteristic of the additional information area. The detailed description about various embodiments related to a display of the additional information area is after-mentioned in FIGS. 12 to 15.

The display device 100 may update and display at least part of the additional information area according to a change of the content screen displayed by the external display device 200 per preset update time point. In the disclosure, the update may be work for changing a display position or a content, a form, a size, or the like of the additional information area, and the update time point may be a state that a condition defined to perform this update is satisfied.

For example, if a content screen displayed by the external display device 200 is a moving image playback screen and the additional information area 211 is a progress bar, the progress bar moves to the right depending on a degree of playback of the moving image. The display device 100 may update and display a position of the moved progress bar per preset update time point.

The preset update time point may include at least one of a time point when a preset period comes up or a time point when a menu or a function for displaying the additional information area is used within a content.

Here, the period may be differently set per menu or function. As aforementioned, if the content displayed by the external display device 200 is the moving image playback screen and the additional information area 212 displayed by the display device 100 is a progress bar, an update period may be set short (specifically, the same period as that of a content playback speed) in order that the movement of the progress bar is proportionate to a playback speed of a real content. As another example, if the content of the external display device 200 is a game screen and the additional information area 212 displayed by the display device 100 is a map screen displayed temporarily in the game screen, the display device 100 may change a position display of the avatar in the map screen in a unit of a certain time period (e.g. 10 seconds).

Meanwhile, in the aforementioned part, it is described that the display device 100 receives and analyzes pixel data from the external display device 200 to extract the additional information area but is not limited thereto.

For example, the external display device 200 may directly analyze the pixel data and extract the additional information area. In this case, the display device 100 may receive data about the additional information area extracted by the external display device 200. Besides, the external display device 200 or another display device rather than the display device 100 (e.g. a server device, a terminal device, other display devices, etc.) may detect the additional information area based on pixel data and then, provide the same to the display device 100.

Otherwise, the display device 100, if the pixel data is received from the external display device 200, may directly detect and display the additional information area as aforementioned based on the pixel data, and if the additional information area detected by the external display device 200 or other devices is received as it is, may display the received additional information area.

The pixel data means data about pixels configuring one screen. The pixel data may include a pixel coordinate, a pixel value, etc. In case of using a Red, Green, Blue (RGB) color model, a pixel value per each pixel coordinate includes data R, G, B.

FIG. 1 shows a state that the display device 100 is connected to the external display device 200 through a wired cable and the external display device 200 is also connected to another electronic device through the wired cable. The electronic device may be various content source devices such as a PC main body, a game player, and a set top box.

A state of being connected through the wired cable is illustrated in FIG. 1 but the display device 100 and the external display device 200, or the external display device 200 and the electronic device may be connected in a wireless communication method.

Specifically, each device may be connected through a wide area network (WAN) such as the Internet, a local area network (LAN) formed to center around an Access Point (AP), and a wireless local area network not through the AP. The wireless local area network may include Bluetooth (IEEE 802.15.1), ZigBee (IEEE 802.15.4), Wi-Fi Direct, Near Field Communication (NFC), Z-Wave, or the like but is not limited thereto.

The display device 100 may store various programs. For example, it may store various programs such as a web browser which may connect to an external server device through the Internet, and an application for performing a function for storing and analyzing pixel data. The display device 100 may perform various operations as a program is executed.

Specifically, if the additional information area is displayed within the content screen in the external display device 200 based on a manipulation such as an input of the user, the display device 100 may receive pixel data about the displayed additional information area and input the same to the stored data analysis program. The data analysis program may analyze what object an object corresponding to each pixel is based on the input pixel data and extract the additional information area according to the analysis result. The display device 100 displays the extracted additional information area autonomously. Accordingly, even if the user removes the additional information area displayed in the external display device 200, the display device 100 may still maintain a display of the additional information area. Accordingly, the user may easily confirm the additional information area while minimizing blocking a view of the external display device 200, so that the user's immersion and convenience may be increased.

Meanwhile, the case of extracting the additional information area based on the pixel data is assumed and described above but it is not necessarily limited to the pixel data, wherein it is possible to extract the additional information area based on other graphic data besides the pixel data.

Hereinafter, according to various embodiments of the disclosure, a method of displaying a setting UI, a method of changing and displaying the additional information area, and the like are specifically described.

Figure 2:
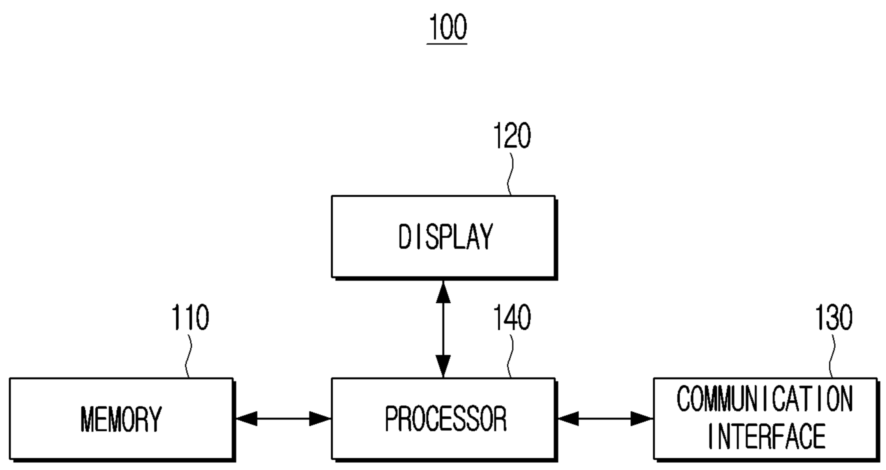
FIG. 2 is a block diagram illustrating a configuration of a display device according to at least one embodiment.

FIG. 2 is a block diagram illustrating a configuration of a display device 100 according to at least one embodiment.

The display device 100 may include memory 110, a display 120, a communication interface 130, and a processor 140.

The memory 110 is a configuration for storing at least one instruction about the display device 100, an Operating System (O/S), a program, pixel data, etc. As an example, it may store a data analysis program such as a pretrained AI model to identify a content displayed by the external display device 200. Specifically, the AI model may be implemented as a Convolutional Neural Network (CNN), Long Short-Term Memory (LSTM), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or the like but is not limited to the above examples. This learning model may be trained by using various data such as data provided by a game server, data provided by an analysis APP server, and the like and may be trained by various methods such as not only an on-device learning method and an AI learning method but also a user-manually-specified learning method.

This AI model is a computing system conceived and implemented based on a neural network of a person or an animal brain and may be referred to as a learning model, a machine learning model, a neural network model, a deep learning model, etc.

The AI model stored in the memory 110 may analyze pixel data received from the external display device 200 and detect the additional information area.

The memory 110 may be implemented as memory embedded in the display device 100 according to a use for data storage or may be implemented as memory detachable from the display device 100. As an example, data for driving the display device 100 is stored in the memory 110 embedded in the display device 100, and data for an extension function of the display device 100 may be stored in the memory 110 detachable from the display device 100.

The memory 110 embedded in the display device 100 may be implemented as at least one of volatile memory (e.g. dynamic RAM (DRAM), static RAM (SRAM), synchronous dynamic RAM (SDRAM), etc.) or non-volatile memory (e.g. one time programmable ROM (OTPROM), programmable ROM (PROM), erasable and programmable ROM (EPROM), electrically erasable and programmable ROM (EEPROM), mask ROM, flash ROM, flash memory (e.g. NAND flash memory, NOR flash memory, etc.), a hard drive, or a solid state drive (SSD)).

The display 120 may display various screens under control of the processor 140. The display 120 may be implemented as a display including a spontaneous emission element or a display including a non-spontaneous emission element and backlight. Also, the display 120 may be implemented as a LFD display. For example, the display may be implemented as various types of displays such as a Liquid Crystal Display (LCD), an Organic Light Emitting Diode (OLED) display, a Light Emitting Diode (LED), a micro LED, a mini LED, a Plasma Display Panel (PDP), a Quantum Dot (QD) display, and a Quantum Dot Light-Emitting Diode (QLED). The display 120 may include a driving circuit which may be implemented in a form such as an a-si TFT, a low temperature poly silicon (LTPS) TFT, or an organic TFT (OTFT), a backlight unit, or the like together.

According to an embodiment, the processor 140, if the game screen is executed in the external display device 200, may display an item area displayed temporarily or fixedly within the game screen through the display 120. As above, the detailed content about displaying the additional information area is specifically described in FIG. 5.

The communication interface 130 includes a circuit and is a component for performing communication with various external devices. Specifically, the communication interface 130 may perform communication with the external display device 200, the server device, or the electronic device. The processor 140 may receive various data or information, in particular, pixel data from the external display device 200 connected through the communication interface 130.

The processor 140 may transmit pixel data or various other data, or information to at least one server device through the communication interface 130. An operation for performing communication with at least one server device is specifically described in FIG. 7.

The communication interface 130 may include not only various wired interfaces such as a USB port, a HDMI port, a display port, a RGB port, a Digital Visual Interface (DVI) port, Thunderbolt, and a component port but also various wireless interfaces such as a Wi-Fi module, a Bluetooth module, a wireless communication module, a NFC module, and an Ultra Wide Band (UWB) module.

FIG. 1 shows a state of connecting to the external display device 200 through the HDMI interface. The processor 140 may receive pixel data from the external display device 200 through the communication interface 130.

The processor 140 controls operations of the display device 100 overall. Specifically, the processor 140 may be connected to each component of the display device 100 to control operations of the display device 100 overall. The processor 140 may be configured of one processor or a plurality of processors.

The processor 140 may perform operations of the display device 100 according to various embodiments by executing one or more instructions stored in the memory 110.

The processor 140 may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. The processor 140 may control one or any combination of other components of the display device 100 and perform an operation related to communication or data processing. The processor 140 may perform one or more programs or instructions stored in the memory 110. For example, the one or more processors 140 may perform a method according to one or more embodiments of the disclosure by executing one or more instructions stored in the memory 110.

In embodiments of the disclosure, the processor 140 may mean a System on Chip (SoC) onto which one or more processors and other electronic components are integrated, a single core processor, a multi core processor, or a core included in the single core processor or the multi core processor, wherein the core may be implemented as a CPU, a GPU, an APU, a MIC, a DSP, a NPU, a hardware accelerator, or a machine learning accelerator but embodiments of the disclosure are not limited thereto.

As an example, the processor 140, if a content executed by the external display device 200 is a moving image content, may display an additional information area including a progress bar indicating a playback time point, and a text area indicating a text related to a content through the display 120.

If the user activates a text area to which the user may input a comment about a moving image while the external display device 200 plays the moving image, the external display device 200 adds and displays the text area to a moving image content screen.

The processor 140 may receive pixel data of image frames configuring this moving image content screen, extract a text area included in each image frame and then, display only the text area through the display 120. In this case, if the user deactivates a text area, the external display device 200 displays a moving image content screen that does not include the text area but the display device 100 displays a text area.

Figure 9:
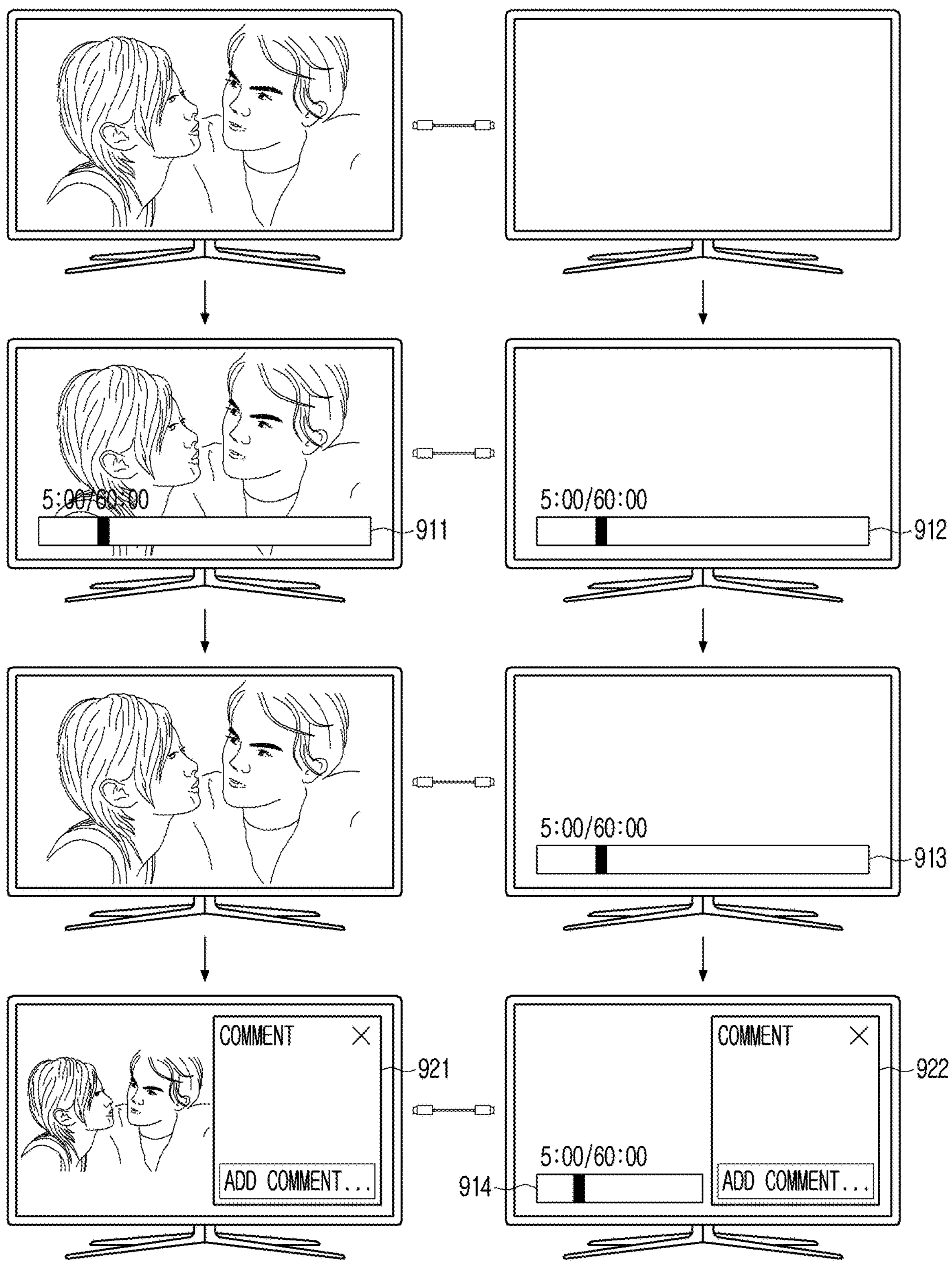
FIG. 9 is a view illustrating an example in which a display of an additional information area is maintained in a display device according to at least one embodiment.

The detailed description about a playback screen of a moving image content is after-mentioned in FIG. 9.

Figure 3:
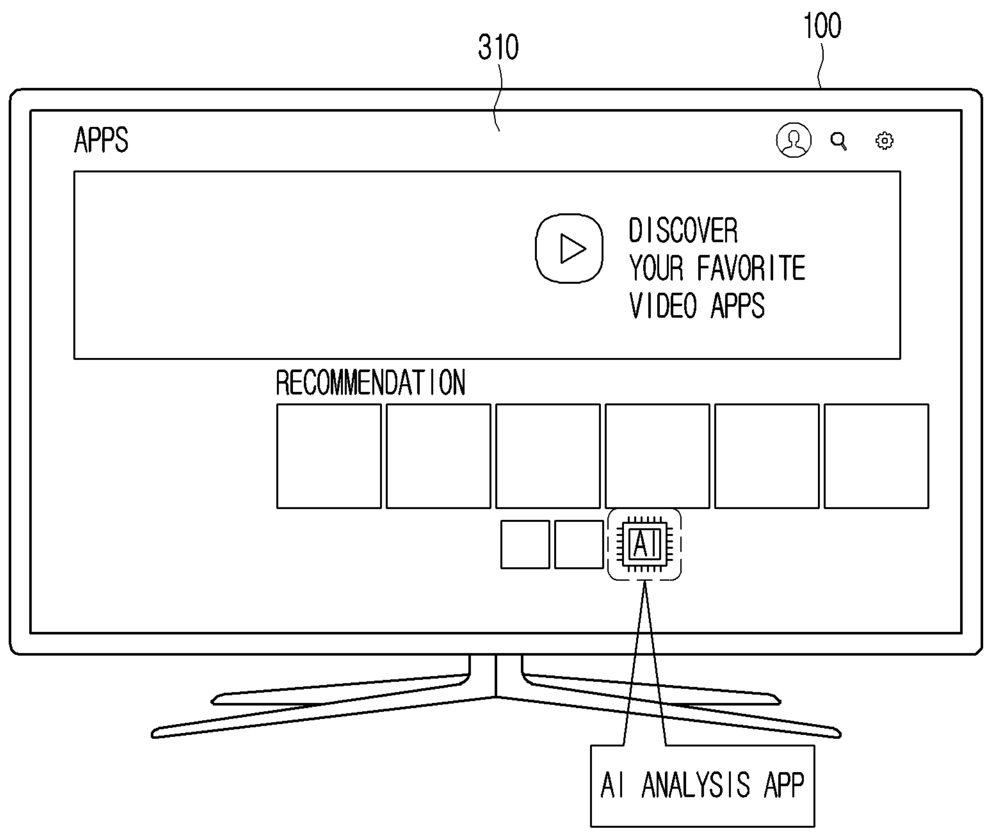
FIG. 3 is a view illustrating an example of a screen displayed by a display device according to at least one embodiment.

FIG. 3 is a view illustrating an example of a screen of a display device according to at least one embodiment.

If the display device 100 is turned on, the processor 140 may control to the display 120 to display a UI 310 including an icon, or the like about various applications installed the display device 100 based on the program stored in the memory 110.

If the application for performing the operation described in FIG. 1 is installed, the processor 140 may display an icon for performing the relevant application. FIG. 3 shows a state that the icon having the name "AI analysis APP" is displayed.

Figure 15:
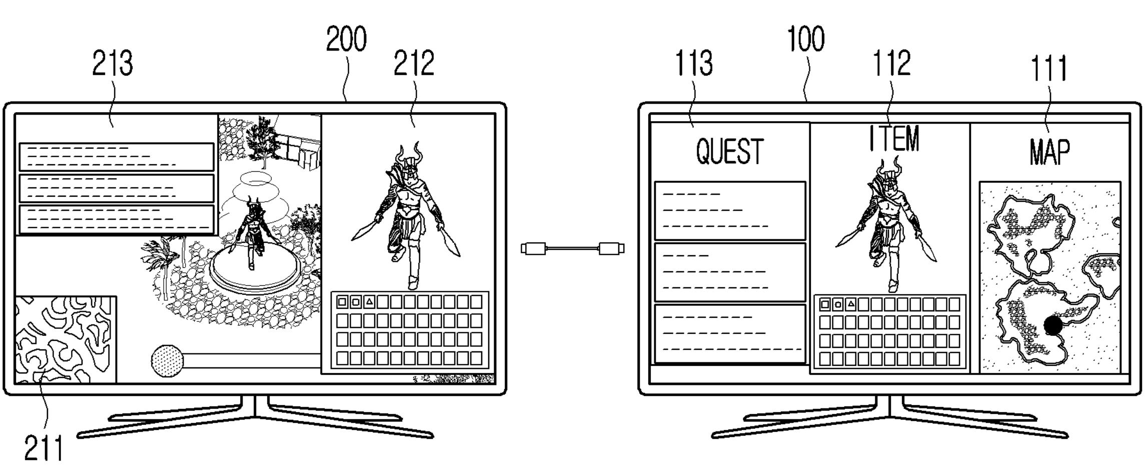
FIG. 15 is a view illustrating an example of a position for displaying an additional information area in a display device according to various embodiments.

If the AI analysis app is selected by the user, the processor 140 may apply an AI model, analyze and process pixel data of the content screen displayed by the external display device 200, and display the aforementioned additional information area. Here, the screen may be displayed in a user convenient form through histogram analysis based on the analyzed pixel data. For example, if a quest window is most frequently used in a game content screen, a quest window 113 may be most priorly placed among the additional information area and displayed on the left of the display device 100 as shown in FIG. 15. The histogram analysis is an analysis method of dividing data into sections and expressing the number of frequencies of data that belongs to each section as a bar graph. Meanwhile, it is not limited thereto, and the additional information area may be provided in a form of a user convenient screen through various analysis methods.

Meanwhile, as the method of analyzing data, a method of analyzing and determining data by using previously defined rules or heuristics, that is, a rule-based analysis model, may be used besides the AI model. In this case, the icon of FIG. 3 may be displayed in another name instead of the AI analysis app.

Besides, the relevant software is not limited thereto and may include an analysis model in a form in which a rule-based system is coupled to machine learning.

Figure 4:
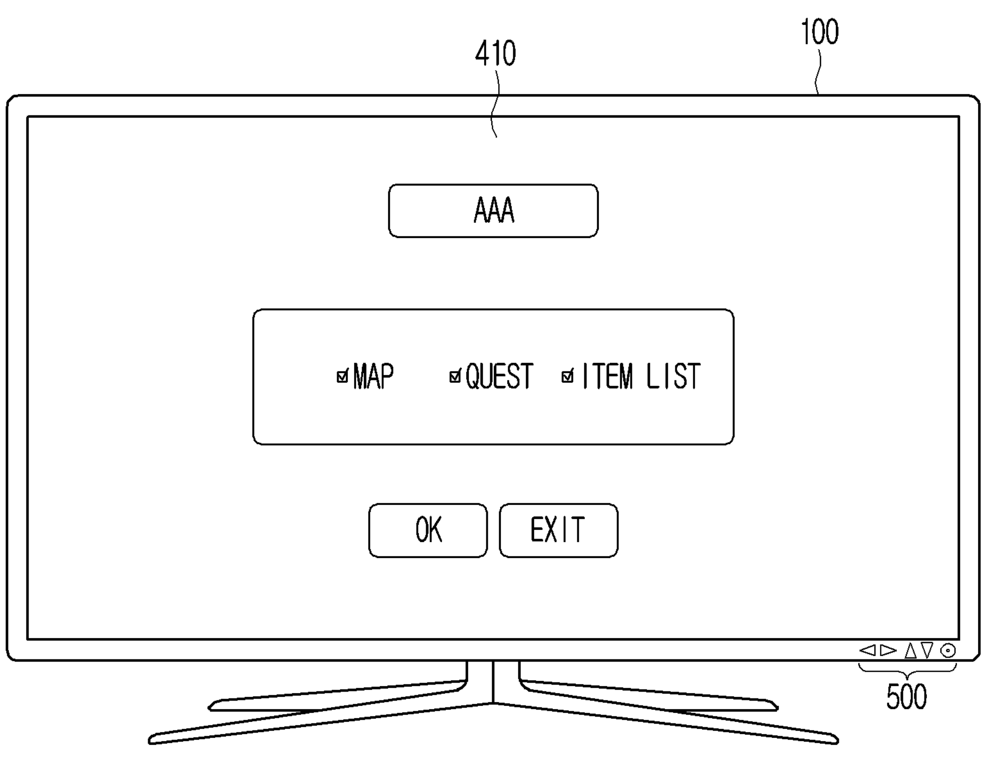
FIG. 4 is a view illustrating a setting UI of a display device according to at least one embodiment.
Figure 4:
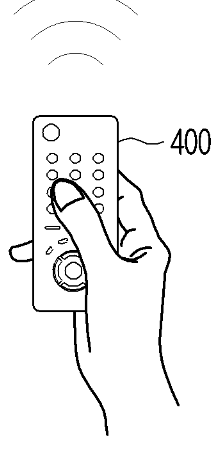

FIG. 4 is a view illustrating a setting UI of a display device 100 according to at least one embodiment.

The processor 140 may display the additional information area, or the like extractable from the content screen executed by the external display device 200 on one setting UI 410. If the extractable additional information area is a plural number, the processor 140 may display each of a plurality of additional information areas within the setting UI 410 in a selectable state. Otherwise, the processor 140 may display only part of extractable additional information areas. For example, the processor 140 may receive and analyze data from at least one server device through the communication interface 130 and selectively display a plurality of useful additional information areas related to the content. For example, if the content is a game screen, the processor may selectively display the additional information area on the setting UI 410 based on the number of display frequencies of the quest area. That is, the additional information area of which display frequencies are not many may not be displayed on the setting UI 410. As above, the plurality of additional information areas displayed on the setting UI 410 may be different for every displayed content and user.

If a manipulation for selecting the additional information area is inputted by the user, the processor 140 may store information about the set additional information area in the memory 110. The processor 140 may extract the additional information area set within the content screen based on the information stored in the memory 110. In FIG. 4, if the user selects only Map, the processor 140 may detect and display only Map part within the content screen of the external display device 200.

The manipulation for selecting the additional information area may be inputted through a user input part 500 or a remote control device 400 within the display device 100. As an example, if the content screen is a game screen, the additional information area may include at least one of a game title area, a map area, an item area, a quest area, a participant information area, or a chatting area, and the additional information area to be displayed by the display device 100 may be selected by the manipulation of the user.

The remote control device 400 may be implemented as a remote controller which controls the display device 100 as shown in FIG. 4 but it is merely an example, wherein it may be implemented as various potable terminals such as a smart phone and a tablet PC.

If the remote control device 400 is used, the display device 100 may further include a RF signal module for receiving a remote signal generated by the remote control device 400. Otherwise, if the remote control device 400 and the display device 100 are connected in a wireless communication method such as a Bluetooth communication, the processor 140 may also receive a control signal of the remote control device 400 through the communication interface 130.

The user input part 500 may be a component which may receive a user command besides the remote control device 400. The user input part 500 may include a button, a lever, a switch, a touch type interface, etc.

The processor 140 may control operations of the display device 100 based on a signal received from the remote control device 400, the user command inputted through the user input part 500, or the like. For example, if a button for setting a UI of the remote control device 400 is selected, the processor 140 may display a setting UI 410 such as FIG. 4. Meanwhile, it is not limited thereto, and the processor 140 may extract an additional information area while a preset time is elapsed after receiving pixel data about the content screen and may configure the setting UI 410 as shown in FIG. 4 by using information about the additional information area extracted until that time. For example, if the title of the content is identified as AAA and the additional information area is three, that is, Map, Quest, Item list, the processor 140 may configure the setting UI 410 including all of the title and the selectable additional information areas as shown in FIG. 4 and display the same through the display 120.

In a similar way, the processor 140 may change a display option of each additional information area. Specifically, if a user manipulation for changing at least one of a display layout, a color, a display position, or a size of the additional information area displayed by the display 120 is inputted through the remote control device 400 or the user input part 500, the processor 140 may change and store information about a display option of the additional information area in the memory 110 according to the manipulation of the user. Thereafter, if an event to display the additional information area occurs, the processor 140 may control the display 120 to display the additional information area in the changed display state based on the stored display option information.

Figure 5:
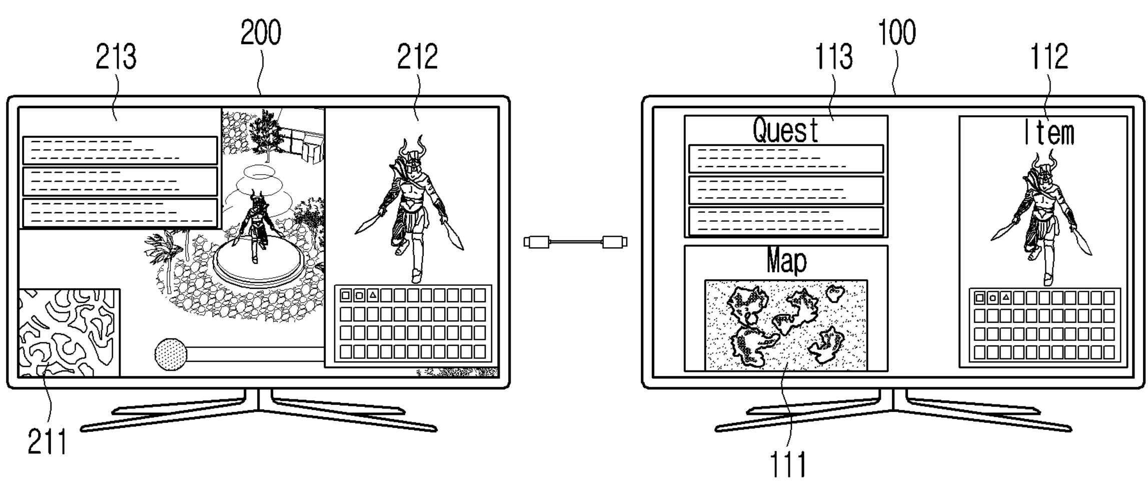
FIG. 5 is a view illustrating an example of displaying an additional information area in a display device according to at least one embodiment.

FIG. 5 is a view illustrating an example of displaying an additional information area in a display device 100 according to at least one embodiment.

If a content screen executed in the external display device 200 connected to the display device 100 is a game screen, the additional information area may include at least one of a game title area, a map area, an item area, a quest area, a participant information area, and a chatting area. The additional information area may be variously varied according to a type of game.

As an example, while a game providing a game screen including an avatar that moves in accordance with the user manipulation, and a background screen is executed by the external display device 200 or an electronic device connected thereto, the user may move the avatar to a desired position to enjoy the game. In this case, the user may press a button for confirming a mini map 211 to confirm a position of the user's own avatar within a game environment. In this case, as shown in FIG. 5, the external display device 200 may overlap and display the mini map 211 on the game screen. Otherwise, if the avatar of the user obtains a new item or a confirmation button for confirming the existing item is pressed, the item 212 is overlapped and displayed on the game screen.

As above, the content screen of the external display device 200, that is, various additional information areas such as the mini map 211, the item 212, and the quest area 213, may be displayed. Part of these additional information areas may be an area which is selectively displayed or disappeared according to the user manipulation and part thereof may be an area which is fixedly maintained.

The display device 100 may receive pixel data about the above and display an entire map 111, an item 112, and a quest area 113. The processor 140 may display each additional information area 111, 112, 113 in the same size and the same form at its position within the original content screen but if the display option information is set through the setting UI as above, a display layout, a color, a display position, a size, or the like may be changed based on the display option information. FIG. 5 shows a state that in comparison to the additional information areas 211, 212, 213 displayed within the original content screen, a name of an area is added to each additional information area 111, 112, 113 (i.e. Map, Item, and Quest), and a size of an partial area becomes large (e.g. 111).

Thereafter, even though the additional information area disappears from the content screen displayed in the external display device 200, the processor 140 may control the display 110 to maintain a display of the additional information area based on pixel data. Accordingly, the user may directly confirm additional information in the surrounding display device 100 if necessary while viewing the content screen that is not blocked by additional information in the mainly viewing external display device 200.

Meanwhile, according to another embodiment of the disclosure, the processor 140 may identify a change of the content screen based on a change of pixel data.

For example, in FIG. 5, the avatar of the user and the background screen may be displayed together on the content screen. Here, if the user moves the avatar to the left, the avatar takes a motion of moving to the left but the background screen moves in a right direction. The processor 140 may track a position of the pixel per each image frame within the pixel data and identify a change of the game screen. For example, it may move the position of the avatar to the left within the mini map 111. The processor 140 may analyze a change speed per time of the pixel corresponding to the background screen and calculate a position movement speed of the avatar. The processor 140 may change a position of the avatar on the mini map 111 in consideration of a scale between a size of the entire map and that of the mini map and a movement speed. Thereafter, if the mini map is displayed again in the external display device 200, the processor 140 may renew the mini map based on the pixel data.

It is not limited to the map, and the processor 140 may change at least one of a game title area, a map area, an item area, a quest area, a participant information area, or a chatting area according to the identified change. For example, if a scene that the avatar obtains a new item, or the like is included in the game screen, the processor 140 may add item information corresponding to a shape of the new item to within the additional information area 112.

According to this embodiment, even though the user does not reactivate the additional information area in the external display device 200, the processor 140 may variously change and display the additional information area.

Figure 6:
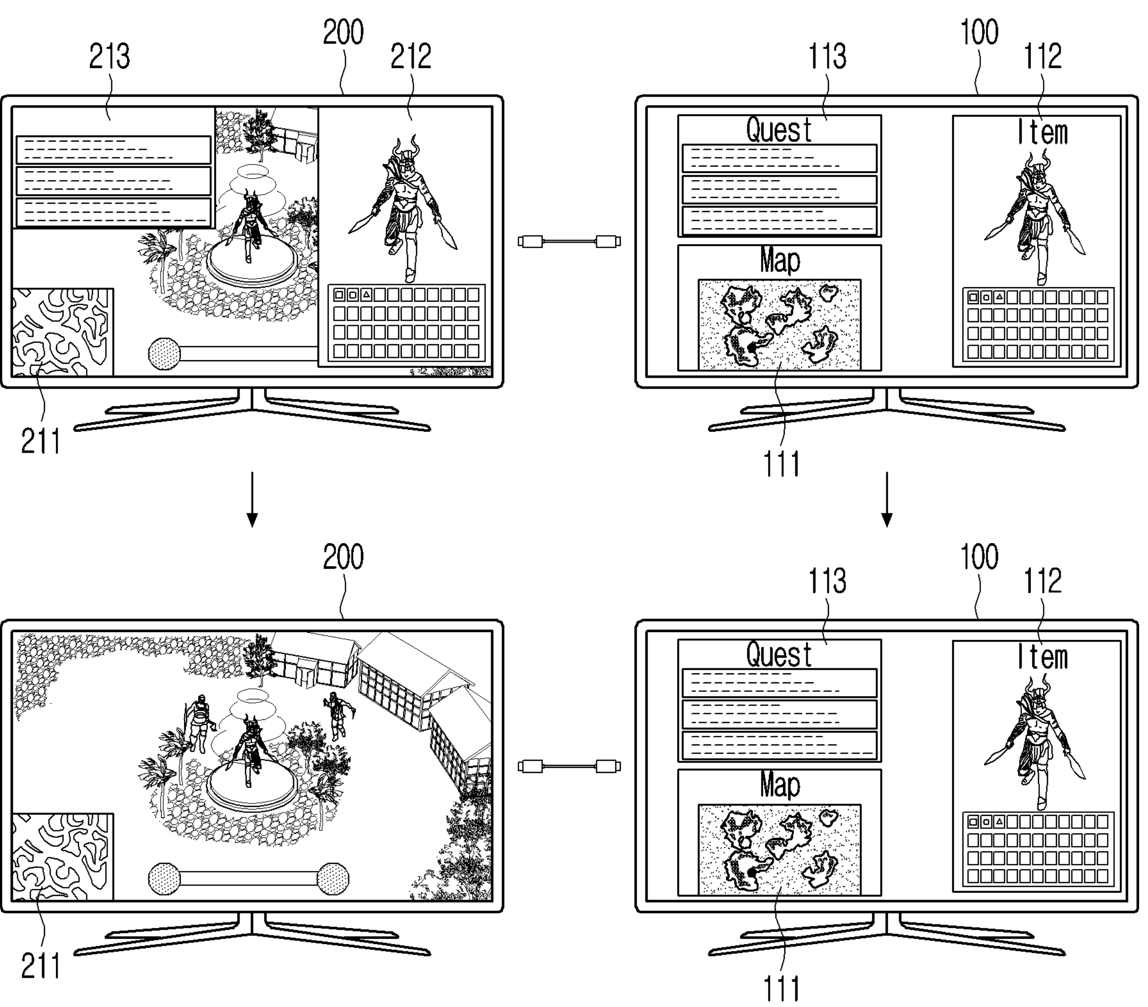
FIG. 6 is a view illustrating an example in which a display of an additional information area is maintained in a display device according to at least one embodiment.

FIG. 6 is a view illustrating an example of maintaining a display of an additional information area in a display device 100 according to at least one embodiment.

FIG. 6 illustrates an operation change of the external display device 200 and the display device 100 together. As above, even though part of the additional information area disappears from the content screen in the external display device 200, the processor 140 may control the display 120 to maintain the additional information area in the external display device 200. As an example, if the content screen is a game screen, even though the quest area and the item area 212, 213 disappear from the external display device 200, a display of the quest area and the item area 112, 113 displayed in the display device 100 may be maintained.

Here, as aforementioned in FIG. 5, the external display device 200 may identify a change of the game screen to change and display the additional information area displayed in the display device 100.

Meanwhile, to identify the additional information area based on the pixel data, the display device 100 may be interconnected with at least one server device.

Figure 7:
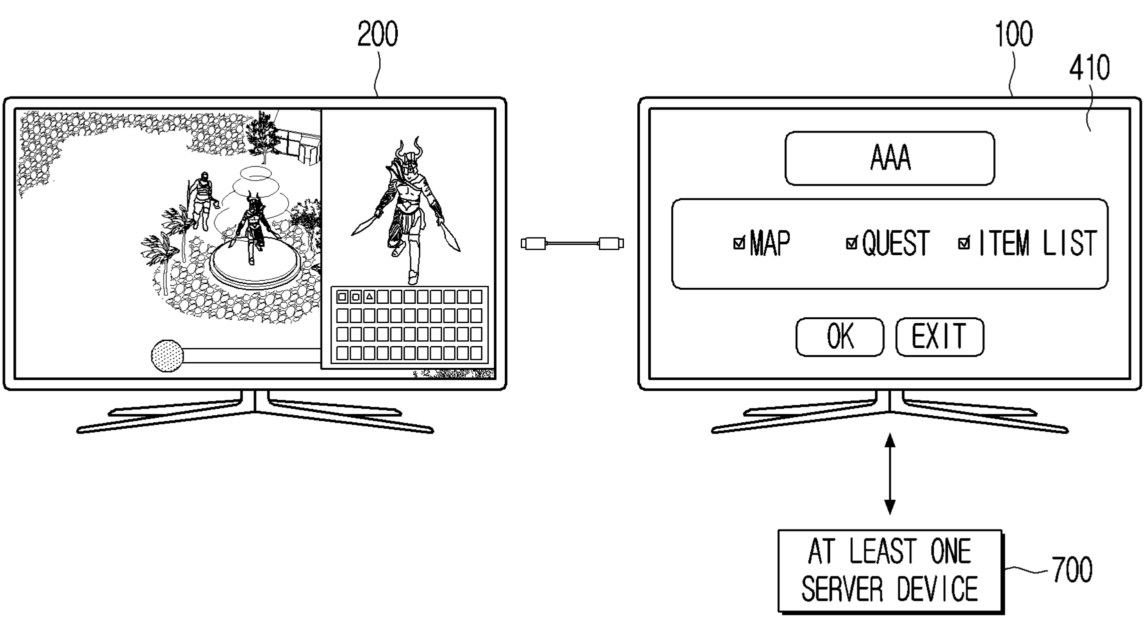
FIG. 7 is a view illustrating an example in which a display device receives data from at least one server device according to at least one embodiment.

FIG. 7 is a view illustrating an example in which a display device 100 receives data from at least one server device according to at least one embodiment.

At least one server device 700 may include a communication part (not shown) communicatable with another server or the display device 100, at least one processor (not shown) capable of processing data received from another server or the display device 100 (not shown), and at least one memory (not shown) capable of storing a program for processing data or the processed data. This server device 700 may be implemented as various computing devices such as a workstation, cloud, a data drive, and a data station. The server device 700 may be implemented as one or more servers which are physically or logically divided based on a function, a detailed configuration of the function, or data and may transmit and receive data through communication between each server and process the transmitted and received data.

The processor 140 may transmit the stored pixel data to at least one server device 700 connected to the communication interface 130. The at least one server device 700, if the pixel data is received, may confirm whether there is an additional information area among the pixel data based on a self database of the sever device 700 or an external database. For the above, various additional information may be stored in the self database of the server device 700 or the external database. For example, in a case of a game content, manufacturers of each game content, a portal server, or the like may provide various image data about a map, an item, a quest, or the like within the game screen. Otherwise, in a case of a moving image content, a manufacturer of the moving image content, or the like may provide various image data such as a highlight image, a profile picture of a character, etc.

The server device 700 groups each pixel within the pixel data into pixel blocks including a plurality of pixels and calculates a representative pixel value of each pixel block. The representative pixel value may be an average pixel value but is not limited thereto, wherein the representative pixel value may be determined based on various criteria. The server device 700, if the representative pixel value forms a closed curve as a plurality of similar pixel blocks are successively positioned, recognizes a line connecting the pixel blocks constituting the closed cure as one object within the content screen. The server device 700 may identify a shape, a color, a size, or the like of the object based on a shape of the line recognized as the object, the number of pixel blocks within the line, the representative pixel value, or the like. The server device 700 compares additional information stored in the self database or the external device to the identified information and determines whether there is matching additional information.

As a result of the determination, the server device 700, if there is the matching additional information, may extract pixels corresponding to the relevant part as an additional information area within the content screen.

Meanwhile, extraction of the additional information area is not limited to the above method, and the server device 700 may extract the additional information area by using the AI model as aforementioned and may extract the additional information area in a method of grafting the rule-based method onto the AI model.

As above, if the server device 700 extracts data about the additional information area from the content screen, the processor 140 may receive data and display the setting UI 410 for setting the additional information area on the display device 100.

Meanwhile, even though the data is not received from the at least one server device, the data may be extracted and displayed in an on-device form. The on-device means a device which does not transmit data to cloud or the external server but directly performs all processing in a device of the user, that is, a smart phone, a tablet, a computer, or the like. In case of implementing in the on-device form, the additional information area may be displayed even if there is no Internet connection and thus, rapid processing is possible without no network delay.

As an example, the memory 110 may prestore data about various additional information.

The processor 140 may compare the stored pixel data to the stored data about the plurality of additional information and extract an area matching to the stored data as an additional information area.

Figure 8:
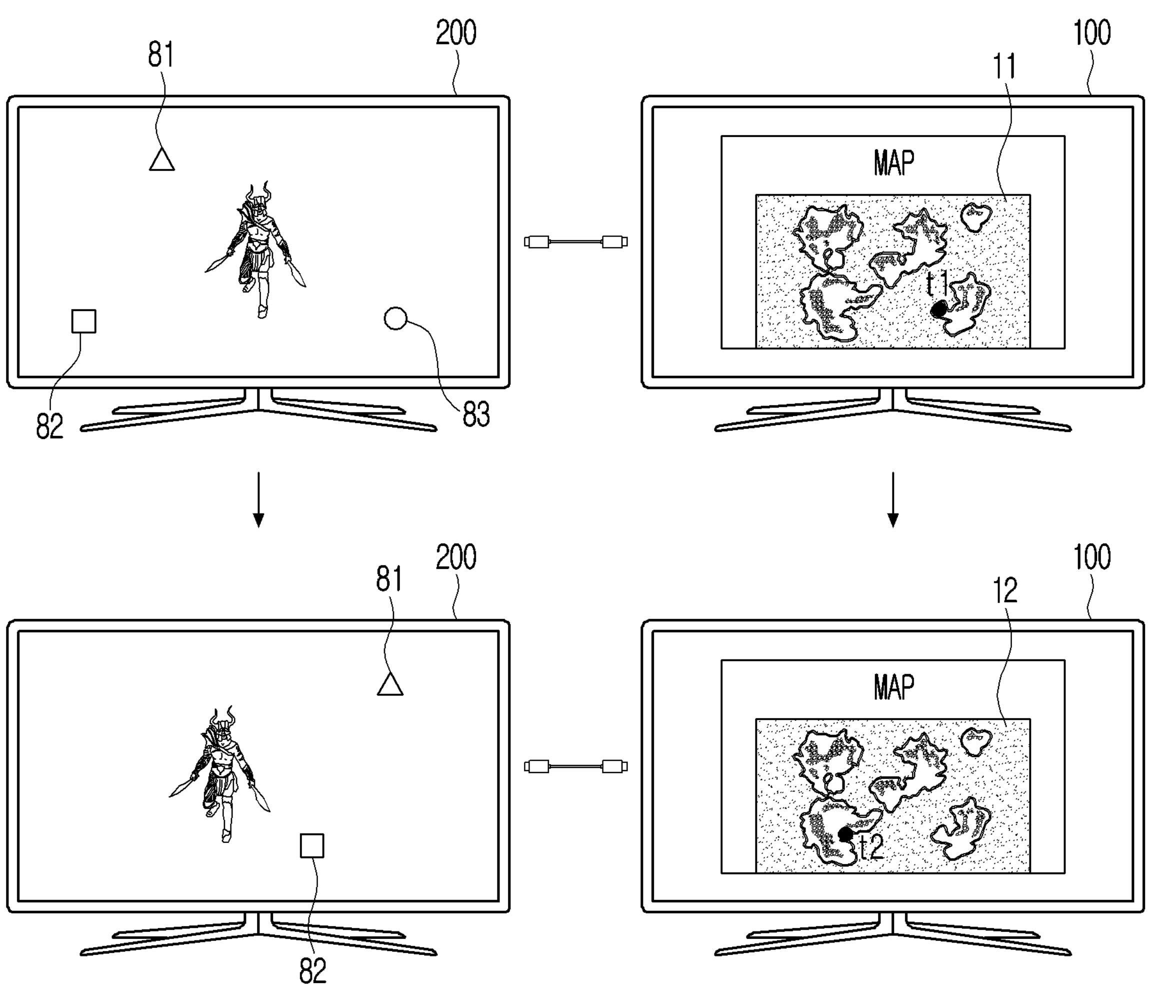
FIG. 8 is a view illustrating an example in which a display device displays a position of an avatar within a map according to at least one embodiment.

FIG. 8 is a view illustrating an example in which a display device 100 displays a position of an avatar within a map according to at least one embodiment.

If a content screen is a game screen including an avatar that moves in accordance with a user manipulation, and a background screen, and an additional information area is a map about a space where the avatar is positioned, the processor 140 may identify a movement direction and a movement distance based on a change of pixel data corresponding to the background screen among pixel data. Also, a position of the avatar within the map may be changed and displayed based on the identified movement direction and the movement distance.

With reference to FIG. 8, if the avatar moves to the left within the background screen, the movement direction and the movement distance of the avatar may be identified based on the pixel data corresponding to the background screen. That is, if a position of an object 81, 82, 83 within the background screen on the left of the avatar is displayed to be changed to the right of the avatar due to the movement of the avatar, the processor may identify the position of the avatar based on the changed pixel data and display to change the position of the avatar from the right (t1) to the left (t2) within the map.

FIG. 9 is a view illustrating an example of maintaining a display of an additional information area in a display device 100 according to at least one embodiment.

If a content screen displayed by the external display device 200 is a playback screen of a moving image content, the display device 100 may display an additional information area about the playback screen of the moving image content.

As an example, if a moving image content is played and a progress bar 911 indicating a playback time point is displayed by a manipulation of the user within the playback screen in the external display device 200, the display device may receive pixel data about the above and display the progress bar 912 indicating the playback time point on the display 120. Here, even if the progress bar indicating the playback time point disappears from the external display device 200, a display of the progress bar 913 displayed by the display device 100 may be maintained. Also, if the text area where a comment about the moving image content may be written is displayed (921), the display device may display the text area 922 together with the existing displayed progress bar 914.

Meanwhile, it is not limited thereto and may display a recommendation content area related to the moving image or a text area indicating a text related to the content besides the progress bar. With respect to the above, the description is specifically made in FIG. 17.

Figure 10:
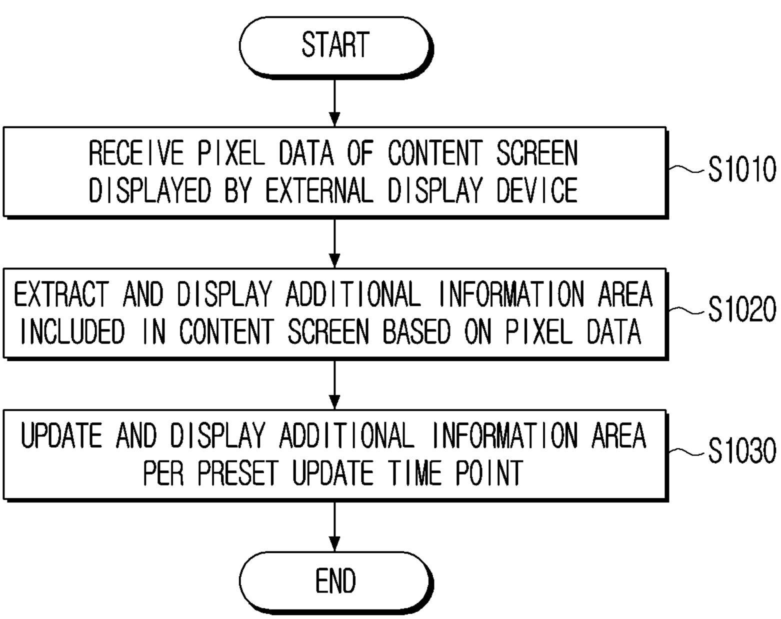
FIG. 10 is a flow chart illustrating a method of displaying of a display device according to at least one embodiment.

FIG. 10 is a flow chart illustrating a method of displaying of a display device according to at least one embodiment.

With reference to FIG. 10, the method includes receiving pixel data of a content screen displayed by an external display device (S1010). Specifically, the pixel data may be received in a form of expressing data R, G, B in a number, respectively.

Further, the method includes extracting and displaying an additional information area included in the content screen based on the pixel data (S1020). For example, the additional information area included in the content screen displayed by the external display device may be extracted and displayed based on the pixel data as aforementioned. The displayed additional information area may be maintained as it is even if a display state of the external display device is changed.

Also, the method includes updating and displaying at least part among the additional information area according to a change of the content screen displayed by the external display device per preset update time point (S1030). For example, if a map screen is temporarily displayed within the game screen, the display device 100 may change and display a position display of the avatar within the map screen in a unit of a certain time period (e.g. 10 seconds).

The extraction and display of the additional information area are specifically described in the aforementioned part, and thus the overlapped description is omitted.

Also, the display device may provide various types of setting UIs as aforementioned. The user may set to selectively display only an additional information area desired by the user among a plurality of additional information areas through the setting UI. Otherwise, a display option of the additional information area displayed by the display device may be also variously changed.

A method displayed in FIG. 10 may be performed by the display device 100 having a configuration shown in FIG. 2 but is not limited thereto, wherein the method may be performed by the display device 100 having a configuration different from that of FIG. 2.

Also, the method may be performed by a user terminal device used by connecting to an external display (e.g. a set top box, a main body of a PC) or a projector device rather than a display device having a display.

Also, besides the case that the plurality of different display devices are used to be connected to one another as aforementioned, at least one embodiment of the disclosure may be also implemented in the display device having one wide display.

For example, if the content screen is displayed in one area within one display, the processor may analyze a pixel value of the content screen and separately display the additional information area within the content screen in another area within the same display.

Meanwhile, various embodiments described above is described under the assumption that one display device 100 is connected to the external display device 200 but the user may connect and use three or more display devices to one another.

Figure 11:
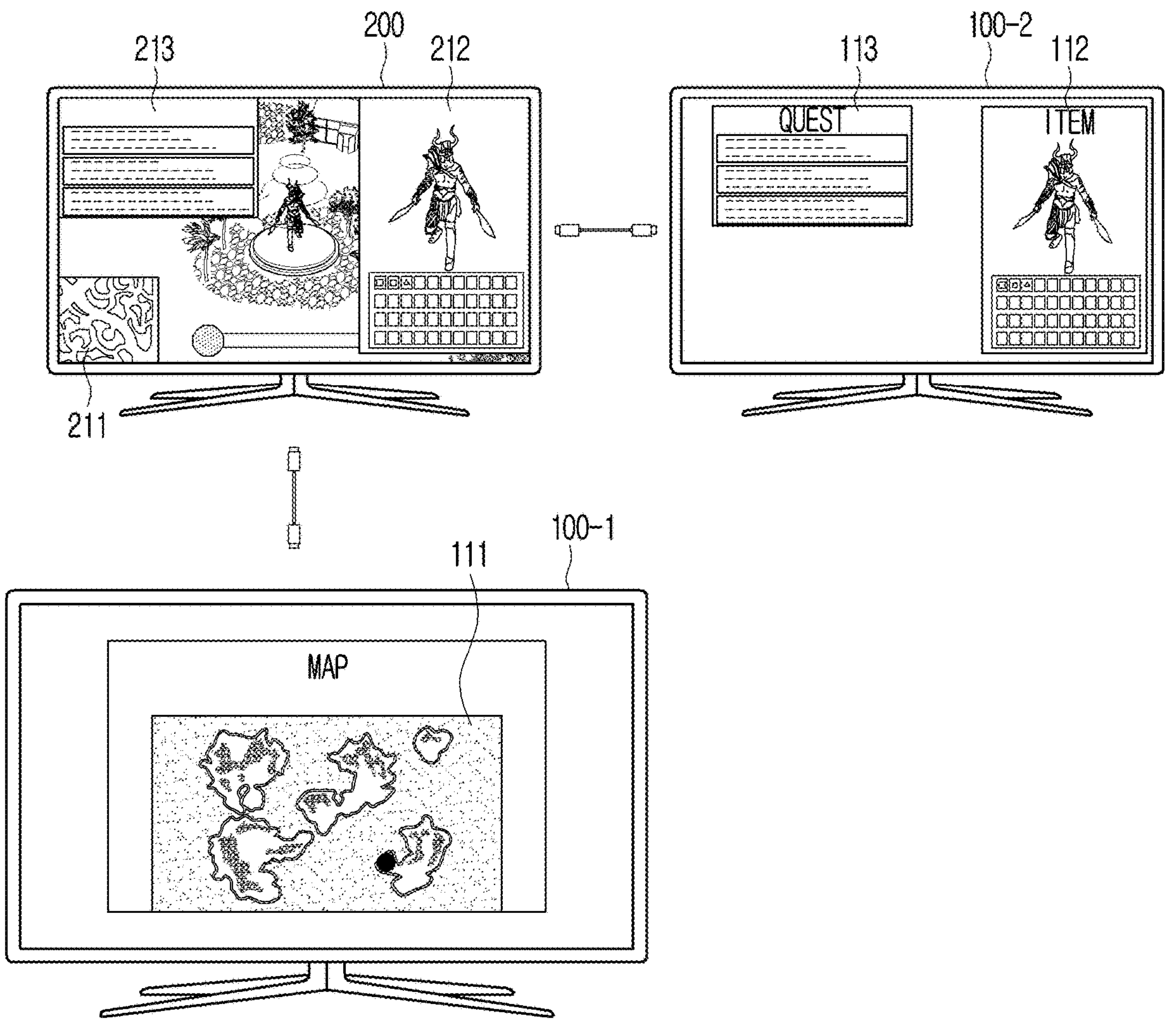
FIG. 11 is a view illustrating an example of displaying an additional information area in three or more display devices according to at least one embodiment.

It is illustrated in FIG. 11 that three display devices 200, 100-1, 100-2 are connected. Specifically, it is assumed in FIG. 11 that two display devices 100-1, 100-2 are connected in both sides centered around the external display device 200 but a connection relation, the number of devices, or the like may be variously changed. For convenience of the description, the display device 200 displaying a content is referred to as a main display device, and two display devices 100-1, 100-2 are referred to as first and second display devices 100-1, 100-2, respectively.

According to FIG. 11, while a content including multiple additional information areas 211, 212, 213 is displayed by the main display device, the first and second display devices 100-1, 100-2 may divide and display additional information areas 111, 112, 113.

An analysis subject detecting an additional information area based on pixel data or a determination subject determining a device for displaying the detected additional information area may be variously determined according to an embodiment.

For example, the analysis subject may be the first display device 100-1 receiving pixel data from the main display device 200 and may be each of the first and second display devices 100-1, 100-2. Otherwise, the main display device 200 itself may be an analysis subject and other external devices (e.g. a server device, a PC) may be an analysis subject.

Alternatively, the analysis subject may be differently determined according to a specification, a connection relation, a connection order, or the like of each device. For example, the specification of each device 200, 100-1, 100-2 may be different in regard of resolution, a size of a display, a capacity of memory, a performance of a CPU, a frame rate, a luminance, etc. Each device 200, 100-1, 100-2 may transmit and receive information about this specification in a connection process and share the same. At least one of each device 200, 100-1, 100-2 may compare the shared information and determine a device having the best specification as an analysis subject.

As an example, the first display device 100-1, if it determines that its specification information is the most excellent, may perform an operation of detecting an additional information area based on pixel data received from the main display device 200. In case of determining the analysis subject, specification information may be compared among other devices, excluding the main display device 200 but it is not limited thereto, wherein to make the determination, the specification information of the main display device 200 may be also considered together.

A time point for selecting the analysis subject may be various time points such as a time point of content execution, a time point of a device power-on, a time point of device connection, and a time point of device separation, and it is not limited thereto. For example, when the device power is turned on, the specification of each device is compared and a device having the best specification may be determined as an analysis subject. Also, if there is a separated device among multiple devices, the specification of each device of which a connection state is maintained when the device is separated is compared and a device having the best specification may be determined as an analysis subject.

The device determined as an analysis subject (e.g. first display device 100-1) may detect an additional information area in the aforementioned method.

The additional information area 211, 212, 213 detected by the above method may be distributed and displayed between other display devices 100-1, 100-2, excluding the main display device 200. What device displays which additional information area may be determined by the aforementioned determination subject. According to an embodiment, the aforementioned analysis subject may be a determination subject as it is but is not limited thereto, wherein the determination subject may be variously determined according to an embodiment. For example, a device in which a capacity of memory or a performance of a CPU among the aforementioned specification is excellent may be determined as a determination subject, a device in which the aforementioned AI analysis APP is executed may be a determination subject, and a device which is most recently connected or first connected to the main display device 200 may be a determination subject.

In FIG. 11, if the first display device 100-1 is determined as a determination subject, a processor of the first display device 100-1 may control the display to transmit at least one of a plurality of additional information areas to another display device, that is, the second display device 100-2 and display the other additional information areas.

FIG. 11 is a view illustrating an example of displaying an additional information area in three or more display devices according to at least one embodiment.

If at least one other display device 100-1 is connected to the external display device 200 or the display device 100-2 and the extracted additional information area 211, 212, 213 is a plural number, the processor may transmit at least one of the plurality of additional information areas to another display device 100-1 and display the other additional information areas. Here, it may compare a performance of the anther display device 100-1 to the display device 100-2 and may also determine an additional information area to be displayed by the another display device 100-1 among the plurality of additional information areas according to a comparison result. Here, the performance of the display device includes a size, resolution, a scanning rate, or the like of the display device and is not limited thereto.

For example, if the additional information area extracted by the external display device 200 is a map area 211, an item area 212, or a quest area 213 and the display device 100-2 and the another display device 100-1 are connected to the external display device, the processor may display the map area 111 in the another display device 100-1 of which a size of a display screen is larger and display the item area 112 and the quest area 113 in the display device 100-2 of which a size of a display screen is smaller. That is, the user may conveniently enjoy the game content by displaying the map area 111 in the display device 100-1 of which the size of the display screen is larger.

Here, the processor may identify the number of the another display device 100-1 connected to the external display device 200 or the display device 100-2 and distribute the additional information area to be displayed by each of the display device 100-2 and the another display device 100-1 based on the number of the another display device 100-1 and the number of the additional information area. Here, as aforementioned, the processor may compare performances of the display devices and distribute the additional information area.

FIGS. 12 to 16 are views illustrating an example of a position for displaying an additional information area in a display device according to at least one embodiment.

Figure 12:
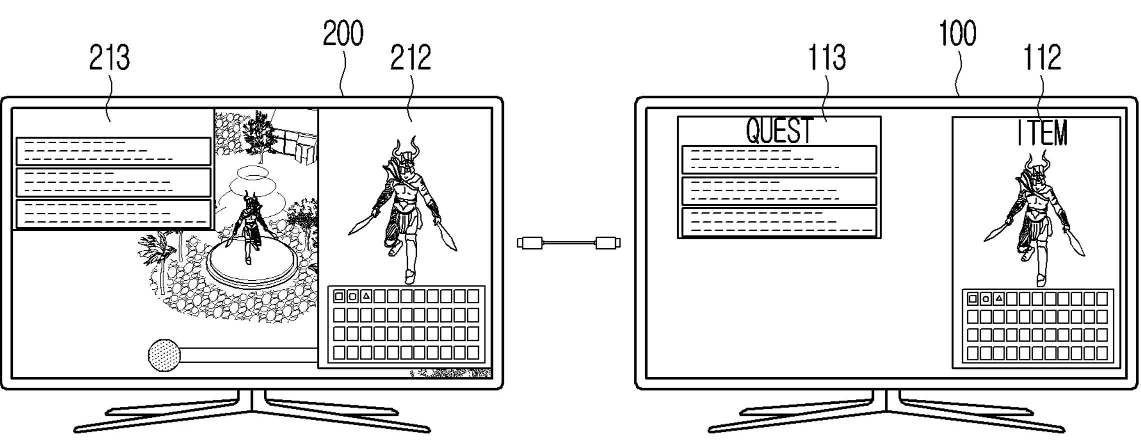
FIG. 12 is a view illustrating an example of a position for displaying an additional information area in a display device according to various embodiments.

The processor 140 may control the display 120 to display the extracted additional information area at a position corresponding to a display position of the additional information area within the content screen. With reference to FIG. 12, if the quest area 213 and the item area 212 are displayed in the external display device 200, the quest area 113 and the item area 112 may be displayed at their positions corresponding to displayed positions among positions of the display device 100 as it is.

Meanwhile, the processor 140 may control the display 120 to display the additional information area in a different layout according to a type of menu or function to display the additional information area within the content. With reference to FIG. 12, display positions of the quest area 113 and the item area 112 displayed in the display device 100 may be changed or a color, a size, or the like may be changed and displayed. Here, the display may be controlled to display the additional information area in a different layout according to an attribute of the content.

Figure 13:
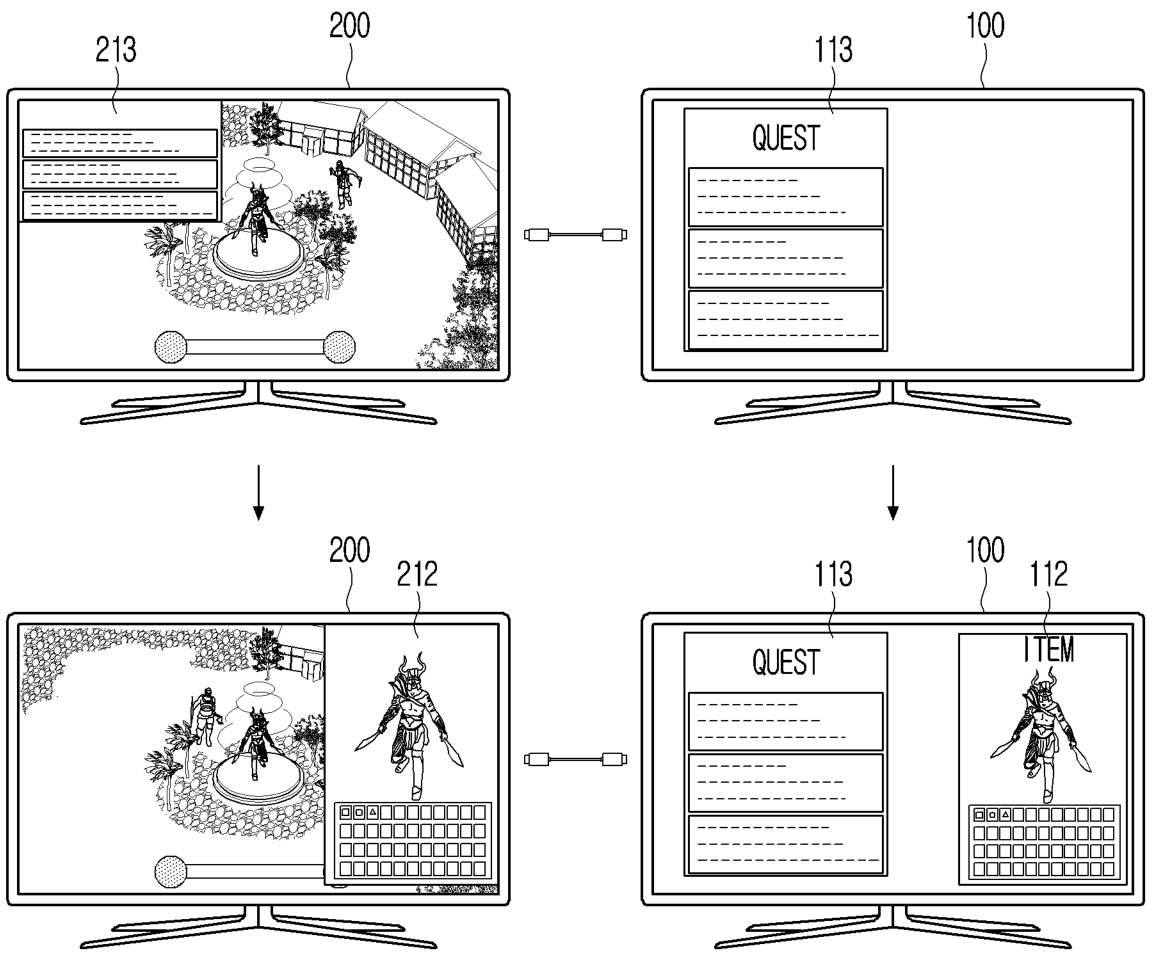
FIG. 13 is a view illustrating an example of a position for displaying an additional information area in a display device according to various embodiments.

Also, the processor 140, if the extracted additional information area is a plural number, may control the display to sequentially arrange and display the extracted additional information areas according a display order of each additional information area within the content screen. With reference to FIG. 13, if the quest area 213 is displayed and the item area 212 is displayed in the external display device 200, the quest area 113 and the item area 112 may be sequentially displayed on a screen of the display device 100.

Figure 14:
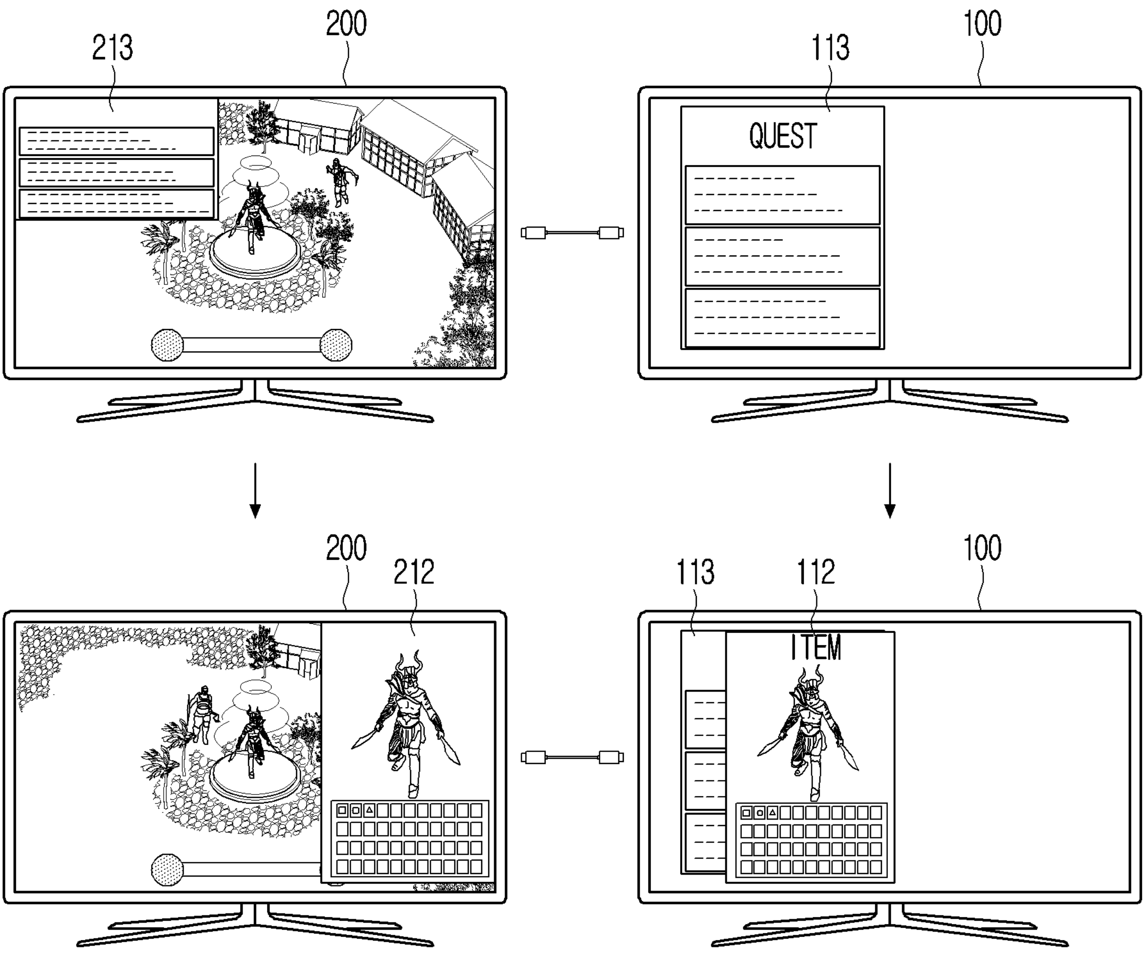
FIG. 14 is a view illustrating an example of a position for displaying an additional information area in a display device according to various embodiments.

Meanwhile, as shown in FIG. 12, the additional information area displayed in the external display device 200 may be displayed in the display device 100 as it is and as shown in FIG. 13, screen displays of the external display device 200 and the display device 100 may be different such that a display of the quest area 213 disappears from a screen of the external display device 200 but is displayed on the screen of the display device 100 as it is. Also, all or part of the relevant additional information area may be displayed in the external display device 200 or the display device 100 according to an attribute of a menu or a function of the additional information area. Also, if the user clicks the quest window in the game content, it is not displayed in the external display device 200 and is displayed only in the display device 100, so that content user convenience may be enhanced. The detailed description about the above is after-mentioned in FIG. 16. The processor 140, if the extracted additional information area is a plural number, may control the display 120 to sequentially stack and display the plurality of extracted additional information areas at the same position according to a display order of each additional information area within the content screen. With reference to FIG. 14, if the quest area 213 is displayed and then, the item area 212 is displayed in the external display device 200, the quest area 113 may be displayed in the display device 100 and then, the item area 112 may be stacked and displayed at the same position. Here, the stacked and displayed additional information areas may be stacked and displayed in an opaque state and may be stacked and displayed in a translucent state.

The processor 140, if the extracted additional information area is a plural number, may control the display 120 to sequentially display the extracted additional information areas according a usage frequency of each additional information area within the content screen. With reference to FIG. 15, if the user most frequently uses the quest area 113 and least uses the map area 211 among the quest area 213, the item area 212, and the map area 211 displayed in the external display device 200, the quest area 113, the item area 112, and the map area 111 may be sequentially displayed starting from the left of the display device 100. Here, the usage frequency of the additional information area may be a value calculated based on at least one of the number of on-off or a usage time of the relevant additional information area.

Figure 16:
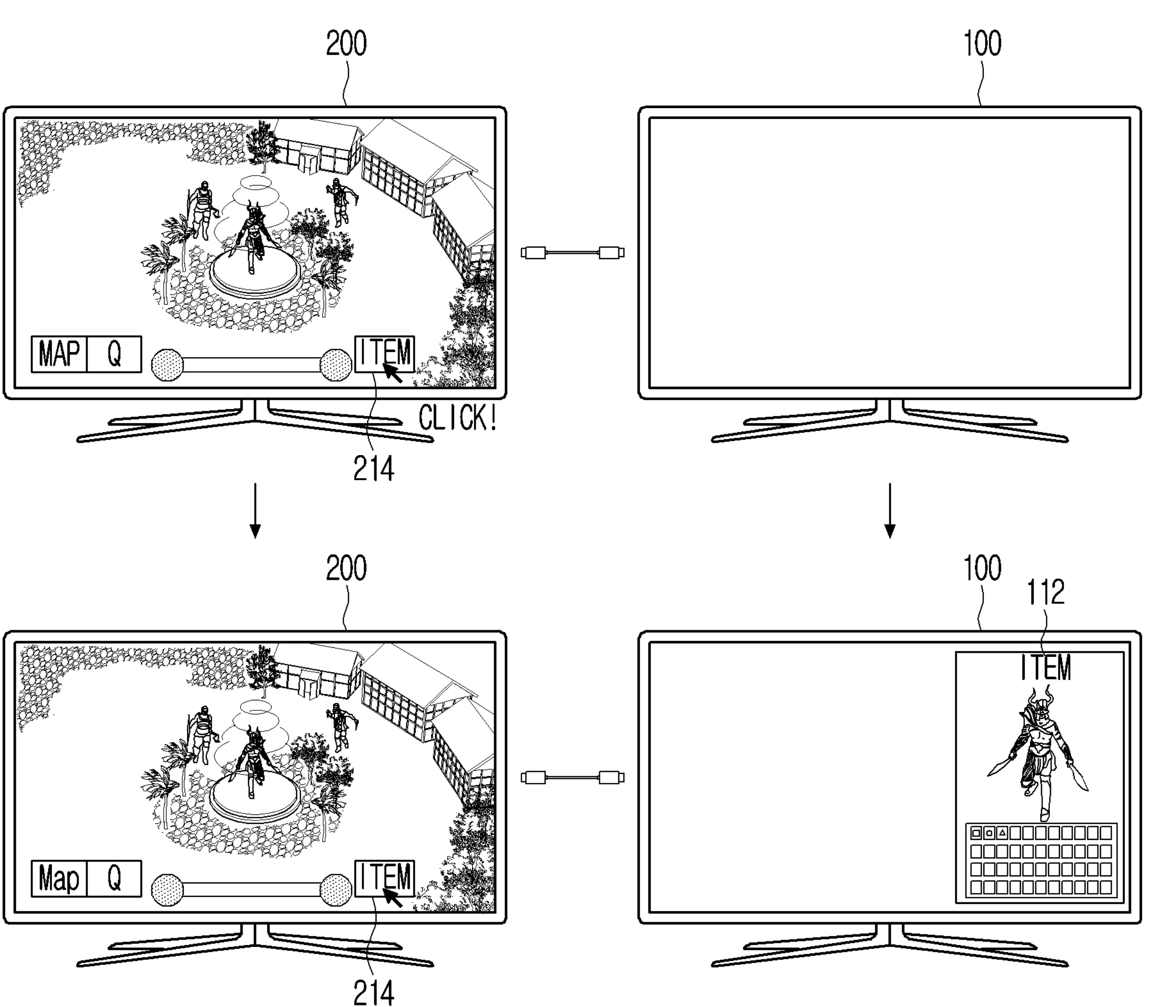
FIG. 16 is a view illustrating an example of a position for displaying an additional information area in a display device according to various embodiments.

FIG. 16 is a view illustrating an example of a screen of the display device 100 in which the additional information area is displayed if the user clicks the additional information window in the external display device 200.

Specifically, if the user clicks a quest window 214, the quest area 213 is not displayed on the screen of the external display device 200 and is displayed only on the screen of the display device 100, and thus screen displays of the external display device 200 and the display device 100 may be different. Meanwhile, the disclosure is not limited thereto, and the additional information area may be displayed only in the screen of the external display device 200 according to a menu for displaying the additional information area or a performance of the display device.

Also, in spite of being not illustrated in FIG. 16, in case of displaying the additional information area in three or more display devices, the additional information area may be selectively displayed only on the screen of a partial display device in the same way. For example, with reference to FIG. 11, if the user clicks the map window, the map area may be displayed only in the display device 100-1 of which the screen is the largest among the display devices.

Figure 17:
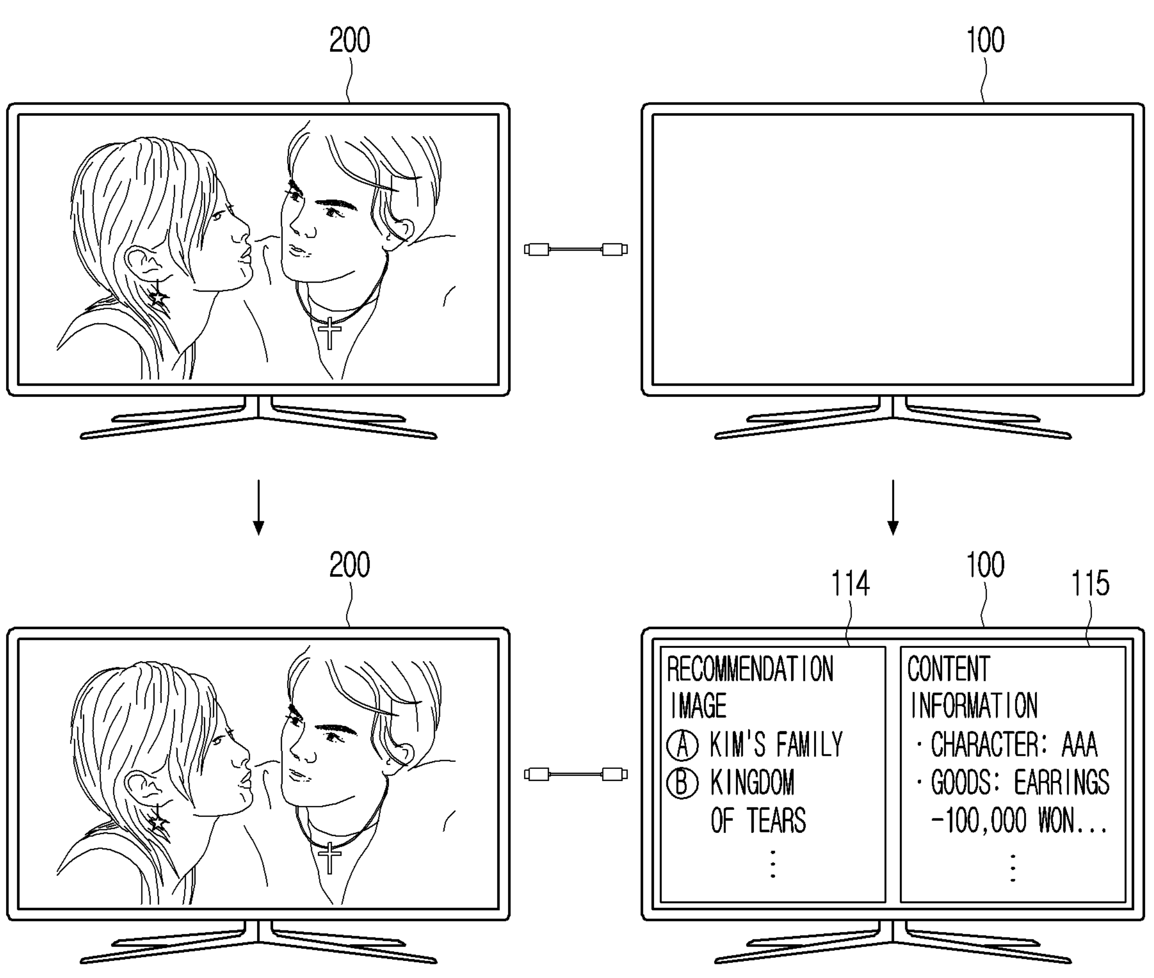
FIG. 17 is a view illustrating an example in which an additional information area is displayed in a display device according to at least one embodiment.

FIG. 17 is a view illustrating an example in which an additional information area is displayed in a display device according to at least one embodiment.

With reference to FIG. 17, if a moving image content screen is displayed in the external display device 200, various additional information related to the played moving image may be displayed in the display device 100. For example, if the moving image content is an image about a specific drama, a recommendation image 114 recommending a drama of which a story is similar to that of the played drama or of which one or more main characters match those of the played drama may be displayed in the display device 100. Also, character information about a character, information about fashion goods such as an accessory and clothes worn by a main character, or the like may be displayed in a form of a content information 115. Meanwhile, it is not limited thereto, and not only a drama and a movie but also various images in which the main character appears may be displayed as the recommendation image.

Figure 18:
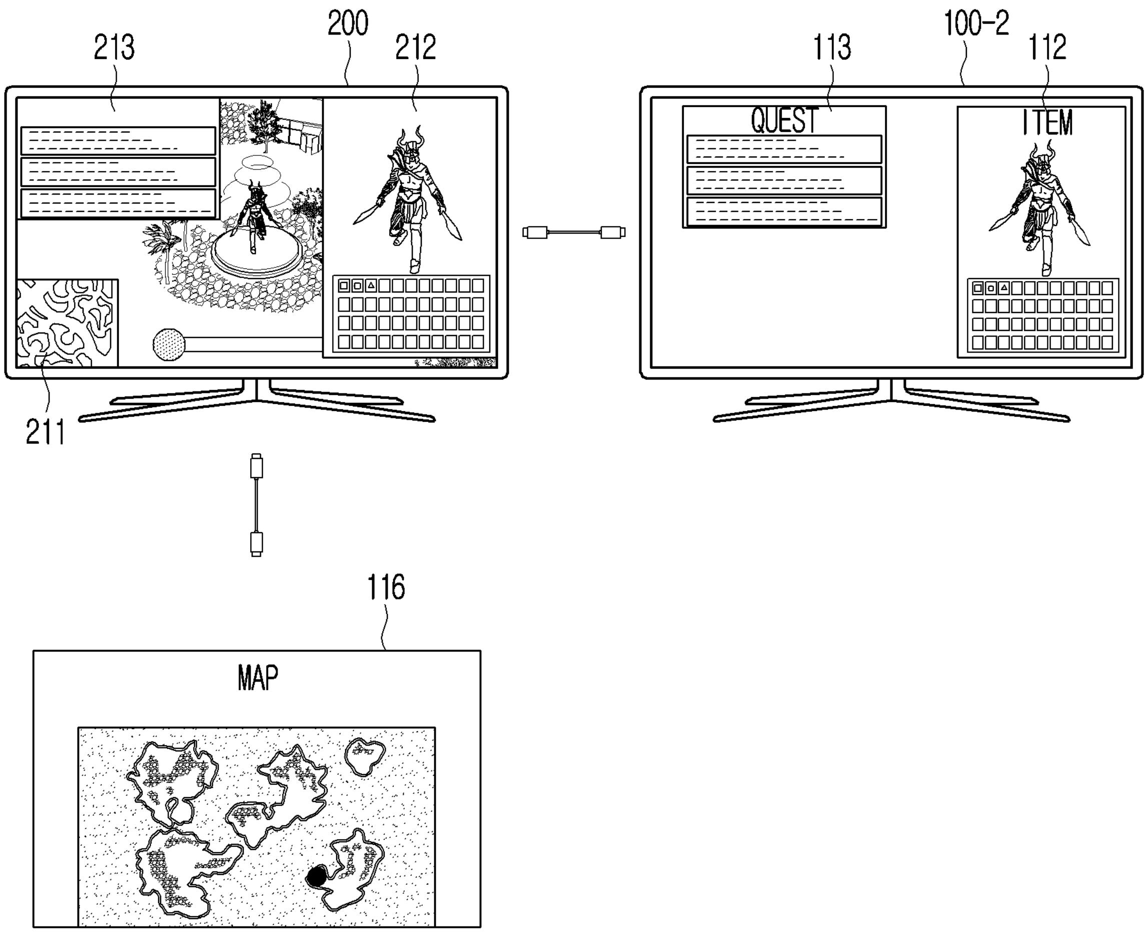
FIG. 18 is a view illustrating an example of displaying an additional information area in a projector display device according to at least one embodiment.
Figure 18:
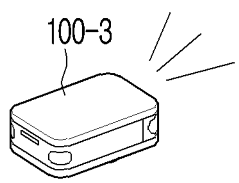

FIG. 18 is a view illustrating an example of displaying an additional information area in a projector display device according to at least one embodiment.

With reference to FIG. 18, part of the plurality of display devices may be implemented as a projector display device 100-3. Specifically, if the plurality of additional information areas 211, 212, 213 are displayed in the external display device 200, only the quest area 113 and the item area 112 are displayed in the display device 110-2 and the map area 116 may be displayed by the projector display device 100-3. Meanwhile, it is not limited thereto, and the additional information area may be distributed and displayed according to performances of the display devices.

Figure 19:
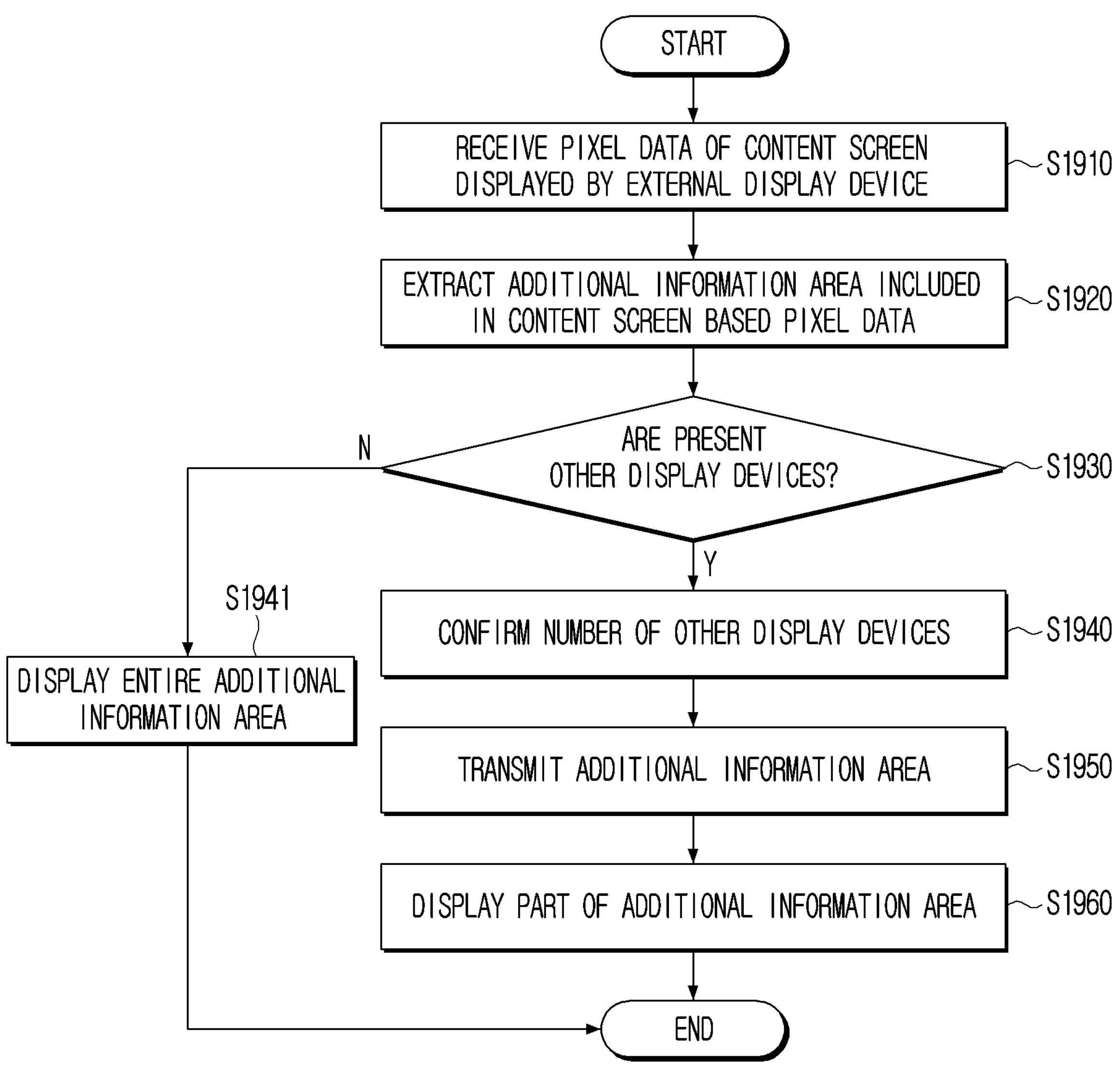
FIG. 19 is a flow chart illustrating a method of displaying of a display device according to at least one embodiment.
Figure 20:
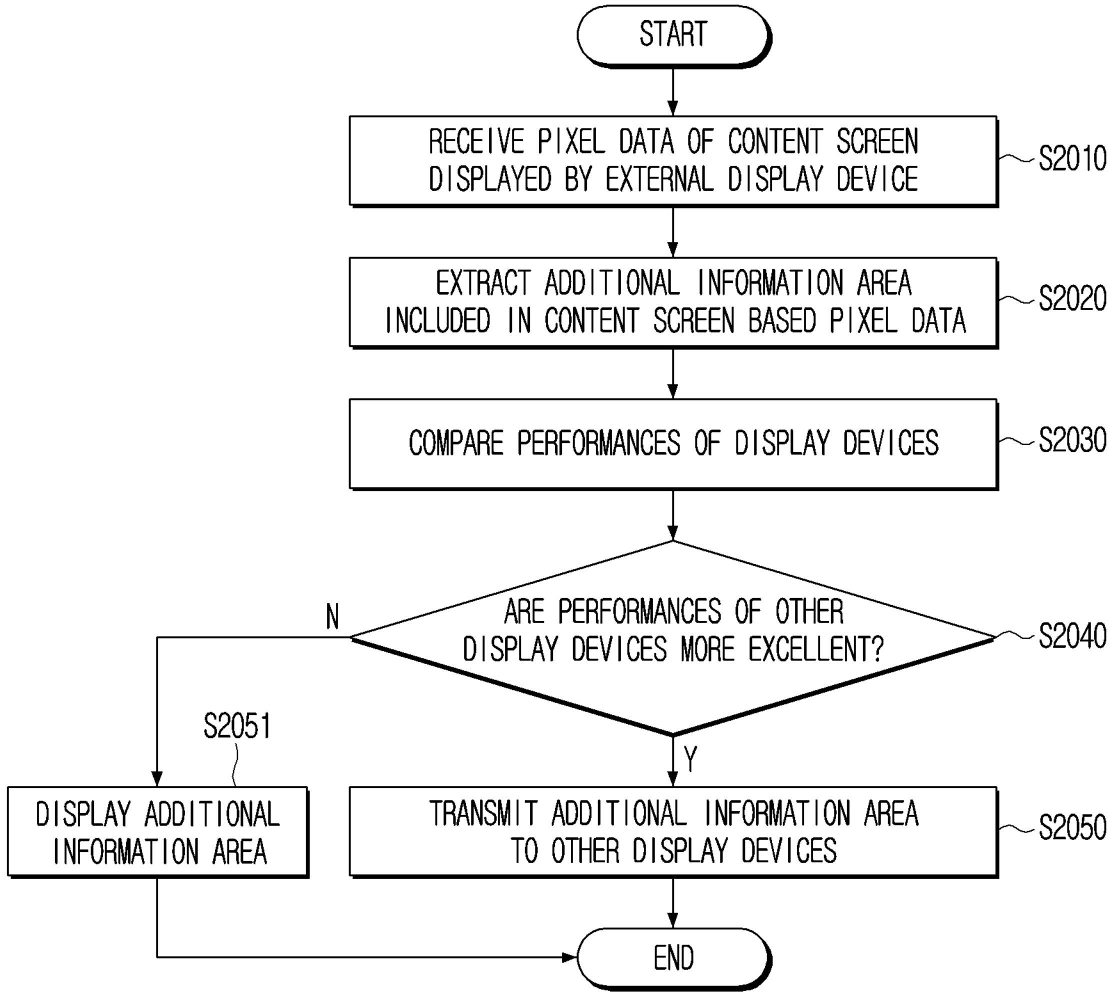
FIG. 20 is a flow chart illustrating a method of displaying of a display device according to at least one embodiment.

FIGS. 19 and 20 are flow charts illustrating a method of displaying of a display device according to at least one embodiment.

With reference to FIG. 19, the display device may receive pixel data of the content screen displayed by the external display device (S1910). Specifically, the display device may receive pixel data from an external display device in a form of expressing data R, G, B in a number, respectively.

Further, the display device may extract an additional information area included in a content screen based on the pixel data (S1920). For example, the display device may extract and display the additional information area included in the content screen displayed by the external display device based on the pixel data as above. The displayed additional information area may be maintained as it is even if a display state of the external display device is changed.

Also, the display device may identify whether other display devices are present (S1930), and if they are present, it may identify the number of other display devices (S1940). Here, the display device may transmit the additional information area based on the number of identified other display devices and the number of additional information areas (S1950) and may display a partial additional information area (S1960). Also, the display device, if identifying that the other display devices are not present, may display the entire additional information area (S1941).

With reference to FIG. 20, the method includes receiving pixel data of the content screen displayed by the external display device (S2010). Specifically, the display device may receive pixel data from the external display device in a form of expressing data R, G, B in a number, respectively.

Further, the display device may extract an additional information area included in the content screen based the pixel data (S2020). For example, the display device may extract and display the additional information area included in the content screen displayed by the external display device based on the pixel data as above. The displayed additional information area may be maintained as it is even if a display state of the external display device is changed.

Also, the display device may compare performances of the display devices (S2030). Here, the performances of the display devices includes a size, resolution, a scanning rate, or the like of the display device.

Further, the display device may identify whether performances of the other display devices are more excellent (S2040), and if identifying that the performances of the other display devices are more excellent, may transmit the additional information area to the other display devices (S2050). On the contrary, the display device, if identifying that the performances of the other display devices are not more excellent, may display the additional information area (S2051). Here, if the transmitted or displayed additional information area is a plurality of additional information areas, the plurality of entire additional information areas may be transmitted or displayed and only part of the additional information areas may be transmitted or displayed.

The display method described in FIGS. 10, 19, and 20 may be performed by a device having various configurations shown in FIG. 2, or the like but is not necessarily limited thereto, wherein the method may be performed by a device having other various configurations.

Various embodiments described as above may be solely implemented as one embodiment and at least one embodiment may be overall or partially combined with one another and be implemented in one device together.

According to various embodiments described as above, it may be minimized to block a view of the external display device by utilizing a graphic outputted from the external display device to display the additional information area in the display device. Ultimately, a degree of immersion in the content and convenience of the user may be enhanced.

Various embodiments of the disclosure may be implemented as software stored in a machine-readable storage medium capable of being mounted onto or connected to a smart phone or a user terminal device, and other various electronic devices (e.g. computer).

Specifically, a non-transitory readable storage medium storing software for sequentially performing receiving pixel data of a content screen displayed by an external display device and extracting and displaying the additional information area included in the content screen based on the pixel data may be provided.

A device onto which this non-transitory readable medium is mounted may perform various operations such as obtaining pixel data, identifying a movement direction and a movement distance of an avatar, extracting and displaying the additional information area, changing of a display of the additional information area, and the like described in various embodiments as aforementioned.

The term 'non-transitory' of the non-transitory readable storage medium merely means that the storage medium does not include a signal and is tangible, wherein the term does not distinguish a case that data is stored in the storage medium semipermanently from a case that data is stored in the storage medium temporarily.

Otherwise, a program for performing a method according to various embodiments as above may be on-line distributed through an application store. In the case of the on-line distribution, at least part of the computer program product may be stored at least temporarily or may be generated temporarily in a storage medium such as memory of a server of a manufacturer, a server of an application store, or a relay server.

Each of components (e.g. a module or a program) according to the various embodiments may be configured as a single item or a plurality of items, wherein a partial subcomponent of the relevant subcomponents may be omitted or another subcomponent may be further included in various embodiments. Mostly or additionally, some components (e.g. a module or a program) may be integrated into one item and may identically or similarly perform a function implemented by each of the relevant components before the integration. According to various embodiments, operations performed by a module, a program, or another component may be executed sequentially, in parallel, repetitively, or heuristically, or at least part of the operations may be executed in different orders or be omitted, or another operation may be added.

As the above, preferable embodiments of the present disclosure are shown and described. However, it is obvious that the disclosure is not limited to the aforementioned specific embodiments, and various modifications may be implemented by those skilled in the art without deviating from the gist of the disclosure claimed in the scope of claims, wherein these modifications should not be independently understood from the technical spirit or prospect of the disclosure.

What is claimed is:

1. A display device comprising:

a display; and a processor configured to:

analyze pixel data of a content screen that is displayed on an external display device, wherein the content screen includes content and an additional information area including additional information related to the content, extract the additional information area based on the analyzed pixel data, display, on the display, the extracted additional information area, and control the display to update at least part of the additional information area displayed on the display according to a change of the content screen displayed by the external display device per a preset update time point.

2. The display device of claim 1, wherein the preset update time point includes:

at least one of a time point when a preset period comes up or a time point when a menu or a function for displaying the additional information area is used in the content, and the preset period is differently set per menu or function.

3. The display device of claim 1, further comprising:

a communication interface, wherein, based on at least one other display device being connected to the external display device or the display device, and the extracted additional information area being more than one additional information area, the processor is configured to:

display, on the display, at least one additional information area of the more than one additional information area, and transmit at least one additional information area of the more than one additional information area to each display device of the at least one other display device through the communication interface.

4. The display device of claim 1, wherein the additional information area includes more than one additional information area, and the processor is configured to:

identify a number of other display devices connected to the external display device or to the display device, and distribute the more than one additional information area to the display device and the other display devices to be displayed, based on the number of other display devices and a number of the more than one additional information area.

5. The display device of claim 1, wherein based on at least one other display device being connected to the external display device or to the display device, the processor is configured to:

compare a performance of the at least one other display device to a performance of the display device and determine a display device to display the additional information area according to a comparison result.

6. The display device of claim 1, wherein the processor is configured to:

control the display to display the additional information area in a different layout than in the content screen according to a type of menu or function for displaying the additional information area.

7. The display device of claim 1, wherein the processor is configured to:

based on the extracted additional information area being more than one extracted additional information area, control the display to sequentially arrange and display the more than one extracted additional information area according to a display order of each additional information area in the content screen.

8. The display device of claim 1, wherein the processor is configured to:

based on the extracted additional information area being more than one extracted additional information area, control the display to sequentially stack and display the more than one extracted additional information areas at a same position according to a display order of each additional information area in the content screen.

9. The display device of claim 1, wherein the processor is configured to:

based on the extracted additional information area being more than one extracted additional information area, control the display to sequentially display the more than one extracted additional information area according to a usage frequency of each additional information area in the content screen.

10. The display device of claim 1, wherein the content screen includes more than one additional information area, and the processor is configured to:

control the display to display a setting UI for setting at least one additional information area of the more than one additional information area to be the extracted additional information area.

11. The display device of claim 1, wherein the processor is configured to:

control the display to display the additional information area based on set information about at least one of a display layout, a color, a display position, or a size of the additional information area, and even when the additional information area disappears from the content screen displayed by the external display device, control the display to maintain displaying of the additional information area.

12. The display device of claim 1, wherein based on the content screen being a game screen, the additional information area includes at least one of a game title area, a map area, an item area, a quest area, a participant information area, or a chatting area, and the processor is configured to:

based on a change of the game screen being identified based on the analyzed pixel data, change at least one of the game title area, the map area, the item area, the quest area, the participant information area, or the chatting area according to the identified change.

13. The display device of claim 1, wherein, based on the content screen being a playback screen of a moving image or a music content, and a selectively displayed area on the content screen according to a user manipulation being at least one area of a progress bar indicating a playback time point in the playback screen, a recommendation content area indicating at least one recommendation content related to the moving image or the music content, or a text area indicating a text related to the moving image or the music content, the processor is configured to:

identify the selectively displayed area as the additional information area to be extracted.

14. A method of a display device that includes a display, the method comprising:

analyzing pixel data of a content screen that is displayed on an external display device, wherein the content screen includes content and an additional information area including additional information related to the content, extracting the additional information area based on the analyzed pixel data, displaying, on the display, the extracted additional information area, and updating at least part of the additional information area displayed on the display according to a change of the content screen displayed by the external display device per a preset update time point.

15. A display device comprising:

a display;

a communication interface; and a processor configured to:

obtain, through the communication interface, pixel data of a content screen displayed on an external display device, wherein the content screen includes content and an additional information area including additional information related to the content, analyze the obtained pixel data, extract the additional information area based on the analyzed pixel data, display, on the display, the extracted additional information area, and control the display to update at least part of the additional information area displayed on the display according to a change of the content screen displayed by the external display device per a preset update time point.

16. The display device of claim 1, wherein the processor is further configured to:

in an event that the additional information area disappears from the content screen displayed on the external display device while the content remains displayed in the content screen displayed on the external display device, maintain the display of the extracted additional information area on the display.

17. The method of claim 14, further comprising:

in an event that the additional information area disappears from the content screen displayed on the external display device while the content remains displayed in the content screen displayed on the external display device, maintaining the display of the extracted additional information area on the display.

18. The display device of claim 15, wherein the processor is further configured to:

in an event that the additional information area disappears from the content screen displayed on the external display device while the content remains displayed in the content screen displayed on the external display device, maintain the display of the extracted additional information area on the display.

* * * * *